US012690095B2

(12) United States Patent
Ji et al.

(10) Patent No.: US 12,690,095 B2
(45) Date of Patent: Jul. 21, 2026

(54) METHOD FOR SELECTING SIDELINK RESOURCE AND APPARATUS FOR THE SAME

(71) Applicant: 1FINITY Inc., Kawasaki (JP)

(72) Inventors: Pengyu Ji, Beijing (CN); Jian Zhang, Beijing (CN); Guorong Li, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 310 days.

(21) Appl. No.: 18/370,705

(22) Filed: Sep. 20, 2023

(65) Prior Publication Data

US 2024/0015841 A1 Jan. 11, 2024

Related U.S. Application Data

(63) Continuation of application No. PCT/CN2021/085135, filed on Apr. 1, 2021.

(51) Int. Cl.
*H04W 76/28* (2018.01)
*H04W 72/02* (2009.01)
*H04W 72/25* (2023.01)

(52) U.S. Cl.
CPC ........... *H04W 76/28* (2018.02); *H04W 72/02* (2013.01); *H04W 72/25* (2023.01)

(58) Field of Classification Search
CPC ..... H04W 76/28; H04W 72/02; H04W 72/25; H04W 74/0808; H04W 76/14; H04W 92/18; H04W 24/02
See application file for complete search history.

(56) References Cited

U.S. PATENT DOCUMENTS

2022/0224497 A1* 7/2022 Li .......................... H04W 76/14
2022/0295514 A1* 9/2022 Shin .................. H04W 52/0216
(Continued)

FOREIGN PATENT DOCUMENTS

CN 111670601 A 9/2020
CN 111885620 A 11/2020
WO 2018/062832 A1 4/2018

OTHER PUBLICATIONS

Fujitsu "Considerations on Partial Sensing and DRX in NR V2X", 3GPP TSG RAN WG1 Meeting #104-e, R1-2101788 (Year: 2021).*
(Continued)

*Primary Examiner* — Ayaz R Sheikh
*Assistant Examiner* — Mang Boi Thawng
(74) *Attorney, Agent, or Firm* — Myers Wolin, LLC

(57) ABSTRACT

An apparatus for selecting a sidelink resource, configured in a terminal equipment supporting sidelink discontinuous reception and sidelink partial sensing, the apparatus includes a memory, and a processor coupled to the memory and configured to determine one or more monitoring slots for performing the sidelink partial sensing for a candidate slot according to configuration information of sidelink discontinuous reception, perform monitoring on sidelink control information at the one or more monitoring slots; and
perform resource selection according to a monitoring result, wherein in a case where the processor is configured to control to perform period-based partial sensing in an inactive time of the sidelink discontinuous reception for a given period, a most recent sensing occasion from slots in the inactive time is taken as a monitoring slot included in the one or more monitoring slots.

16 Claims, 14 Drawing Sheets

(56)                 References Cited

U.S. PATENT DOCUMENTS

| | | | | |
|---|---|---|---|---|
| 2023/0217466 | A1 | 7/2023 | Zhao | |
| 2023/0345422 | A1* | 10/2023 | Lin | H04W 72/02 |
| 2023/0362896 | A1* | 11/2023 | Wu | H04W 72/02 |
| 2024/0031997 | A1* | 1/2024 | Lin | H04W 4/40 |
| 2024/0089993 | A1* | 3/2024 | Lee | H04W 72/1263 |
| 2024/0107454 | A1* | 3/2024 | Lin | H04W 76/14 |
| 2024/0172320 | A1* | 5/2024 | Ko | H04W 4/40 |
| 2024/0188136 | A1* | 6/2024 | Liu | H04W 52/0229 |

OTHER PUBLICATIONS

ASUSTek, "Discussion on partial sensing and SL DRX impact", 3GPP TSG RAN WG1 #104-e, R1-2101572 (Year: 2021).*

Intel Corporation, "Design of UE Sidelink Power Saving Solutions", 3GPP TSG RAN WG1 Meeting #104-E, R1-2100672 (Year: 2021).*

LG Electronics, Discussion on physical layer design considering sidelink DRX operation, 3GPP TSG RAN WG1 #103-e, R1-2007897 (Year: 2020).*

Huawei, HiSilicon, "Physical layer impacts of sidelink DRX", 3GPP TSG RAN WG1 #102-e, R1-2006402 (Year: 2020).*

Notice of Reasons for Refusal issued by the Japan Patent Office for corresponding Japanese Patent Application No. 2023-559135, mailed on Oct. 1, 2024, with an English translation.

International Search Report and Written Opinion of the International Searching Authority issued by the China National Intellectual Property Administration for corresponding International Patent Application No. PCT/CN2021/085135, mailed on Jan. 4, 2022, with an English translation.

Huawei et al., "Sidelink resource allocation to reduce power consumption", Agenda Item: 8.11.1.1, 3GPP TSG-RAN WG1 Meeting #104-e, R1-2100205, Jan. 25-Feb. 5, 2021.

3GPP TS 38.214 V16.4.0, "3rd Generation Partnership Project; Technical Specification Group Radio Access Network; NR; Physical layer procedures for data (Release 16)", Dec. 2020.

CATT, "Impacts of Sidelink DRX on the Other Procedures", Agenda Item: 8.15.2.4, 3GPP TSG-RAN WG2 Meeting #113-e, R2-2100238, Electronic, Jan. 25-Feb. 5, 2021.

* cited by examiner

501 a terminal equipment determines one or more monitoring slots for performing sidelink partial sensing for a candidate slot according to configuration information of the sidelink discontinuous reception

502 monitoring is performed on sidelink control information at the monitoring slots

503 resource selection is performed according to a monitoring result

FIG. 5

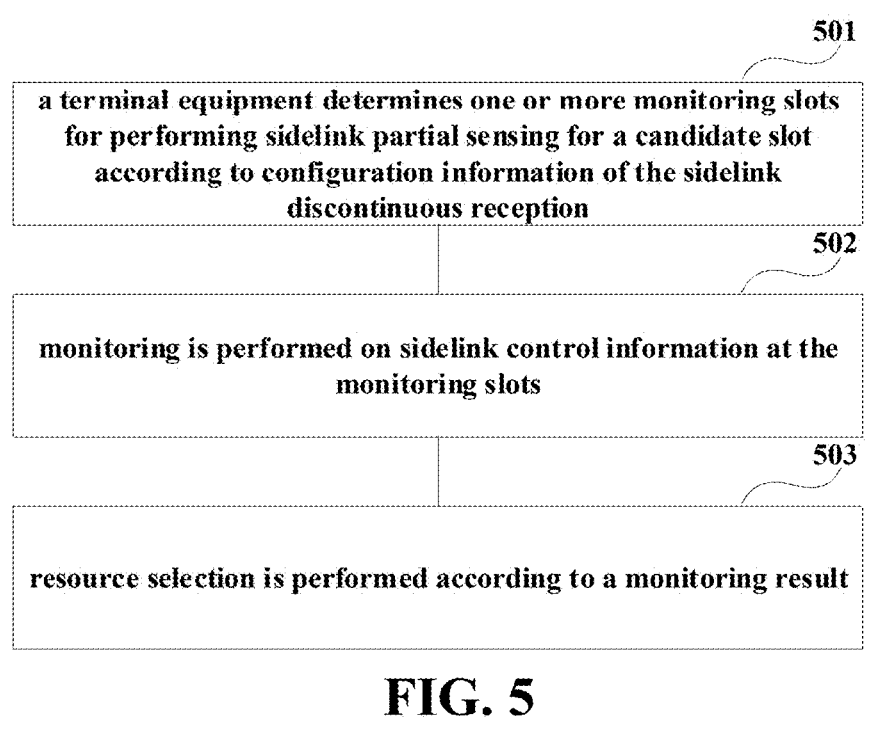

801 a terminal equipment determines one or more monitoring slots for performing sidelink partial sensing for each of a plurality of candidate slots according to configuration information of sidelink discontinuous reception

802 monitoring is performed on sidelink control information at the monitoring slots

803 resource selection is performed according to a monitoring result

FIG. 8

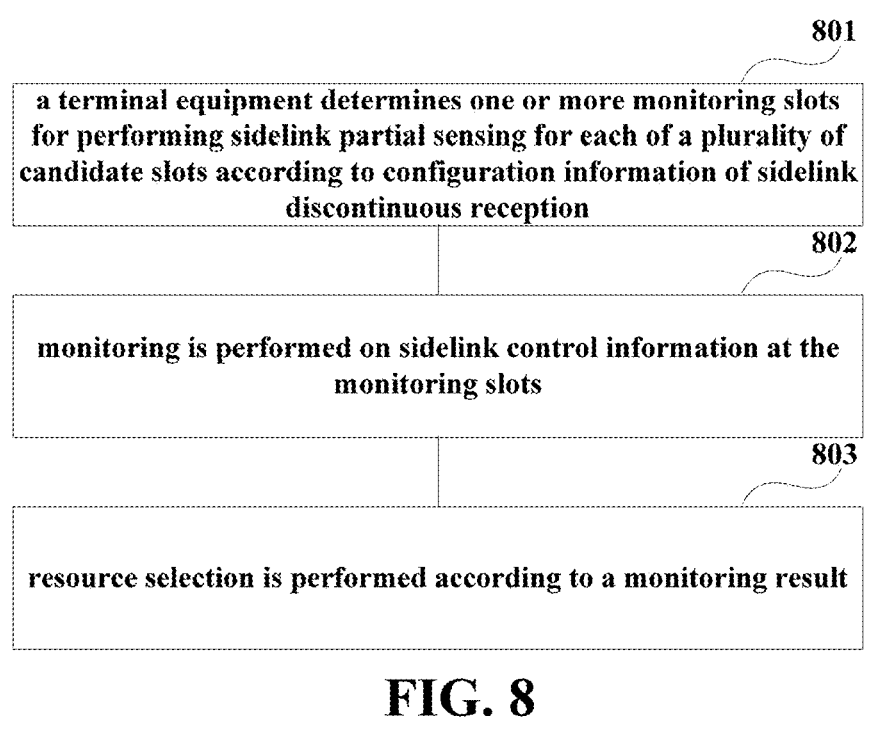

METHOD FOR SELECTING SIDELINK RESOURCE AND APPARATUS FOR THE SAME

CROSS REFERENCE TO RELATED APPLICATION

This application is a continuation application of International Application PCT/CN2021/085135 filed on Apr. 1, 2021, and designated the U.S., the entire contents of which are incorporated herein by reference.

TECHNICAL FIELD

This disclosure relates to the field of communication technologies.

BACKGROUND

For some terminal equipment, such as a pedestrian user equipment (P-UE), it is necessary to study a power-saving mechanism on a sidelink. LTE V2X supports a resource selection mechanism of partial sensing. For a transmitting terminal equipment, partial sensing may be performed on the sidelink, that is, monitoring may be performed in a part of subframes of a system frame, in order to achieve an effect of saving power.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

The inventors found that sidelink discontinuous reception (DRX) needs to be studied according to a work item description (WID) of Rel-17V2X. For a receiving terminal equipment, DRX may be configured or pre-configured on the sidelink to achieve an effect of saving power. However, when the terminal equipment acts as both a transmitting device and a receiving device on the sidelink, that is, when DRX is configured or pre-configured whilst partial sensing is performed, there is currently no consideration of how to further save power.

To address at least one of the problems, embodiments of this disclosure provide a method for selecting a sidelink resource and an apparatus for the same.

According to one aspect of the embodiments of this disclosure, there is provided a method for selecting a sidelink resource, applied to a terminal equipment supporting sidelink discontinuous reception and sidelink partial sensing. The method includes:

determining, by the terminal equipment, one or more monitoring slots for performing the sidelink partial sensing for a candidate slot according to configuration information of the sidelink discontinuous reception;

performing monitoring on sidelink control information at the monitoring slots; and performing resource selection according to a monitoring result.

According to another aspect of the embodiments of this disclosure, there is provided an apparatus for selecting a sidelink resource, configured in a terminal equipment supporting sidelink discontinuous reception and partial sidelink sensing. The apparatus includes:

a determining unit configured to determine one or more monitoring slots for performing the sidelink partial sensing for a candidate slot according to configuration information of the sidelink discontinuous reception;

a monitoring unit configured to perform monitoring on sidelink control information at the monitoring slots; and a selecting unit configured to perform resource selection according to a monitoring result.

According to another aspect of the embodiments of this disclosure, there is provided a method for selecting a sidelink resource, configured in a terminal equipment supporting sidelink discontinuous reception and sidelink partial sensing. The method includes:

determining, by the terminal equipment, one or more monitoring slots for performing the sidelink partial sensing for each of a plurality of candidate slots according to configuration information of the sidelink discontinuous reception;

performing monitoring on sidelink control information at the monitoring slots; and performing resource selection according to a monitoring result.

According to another aspect of the embodiments of this disclosure, there is provided an apparatus for selecting a sidelink resource, configured in a terminal equipment supporting sidelink discontinuous reception and sidelink partial sensing. The apparatus includes:

a determining unit configured to determine one or more monitoring slots for performing the sidelink partial sensing for each of a plurality of candidate slots according to configuration information of the sidelink discontinuous reception;

a monitoring unit configured to perform monitoring on sidelink control information at the monitoring slots; and a selecting unit configured to perform resource selection according to a monitoring result.

According to another aspect of the embodiments of this disclosure, there is provided a communication system, including:

a terminal equipment supporting sidelink discontinuous reception and sidelink partial sensing, the terminal equipment being configured to determine one or more monitoring slots for performing the sidelink partial sensing for one or more candidate slots according to configuration information of the sidelink discontinuous reception, perform monitoring on sidelink control information at the monitoring slots, and perform resource selection according to a monitoring result.

One of the advantageous effects of the embodiments of this disclosure is that for a terminal equipment supporting sidelink DRX and sidelink partial sensing, considering that the terminal equipment acts as both a transmitting device and a receiving device, one or more monitoring slots for performing the sidelink partial sensing is/are determined for one or more candidate slots according to configuration information of the sidelink DRX; thus, the monitoring slot for performing partial sensing is enabled to overlap with the active time of the sidelink DRX as much as possible, thereby further saving power and improving a power-saving effect of the terminal equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 5 is a schematic diagram illustrating a method for selecting a sidelink resource according to an embodiment of this disclosure;

FIG. 8 is a schematic diagram illustrating a method for selecting a sidelink resource according to an embodiment of this disclosure;

DETAILED DESCRIPTION

Figure 1:
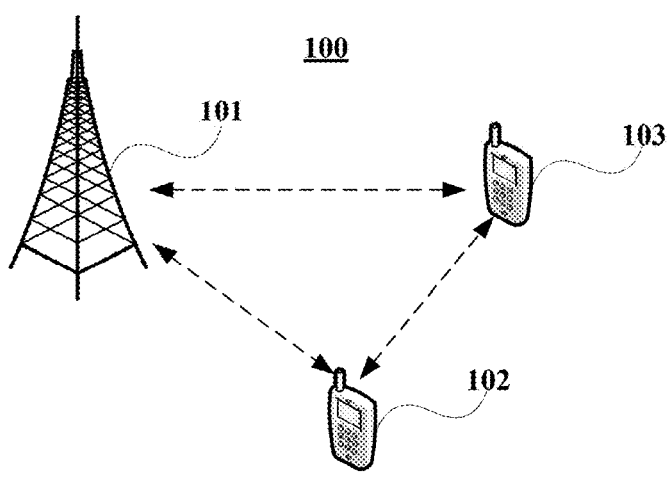
FIG. 1 is a schematic diagram illustrating a communication system according to an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division a plurality of access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses terminal equipment to the communication network and provides services for the terminal equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above. "A device" in this text may refer to a network device, and may also refer to terminal equipment, except otherwise specified.

A scenario of an embodiment in this disclosure shall be described below by way of examples; however, this disclosure is not limited thereto.

FIG. 1 is a schematic diagram illustrating a communication system according to an embodiment of this disclosure, which schematically illustrates a situation in which a terminal equipment and a network device are used as an example. As illustrated in FIG. 1, a communication system 100 may include a network device 101 and terminal equipments 102 and 103. For simplicity, FIG. 1 only illustrates two terminal equipments and one network device as an example; however, this disclosure is not limited thereto.

In an embodiment of this disclosure, existing services or services that may be implemented in the future may be transmitted between the network device 101 and the terminal equipment 102 and 103. For example, these services may include but are not limited to: an enhanced Mobile Broadband (eMBB), a massive Machine Type Communication (mMTC) and an Ultra-Reliable and Low Latency Communication (URLLC), etc.

It should be noted that FIG. 1 illustrates that both the terminal equipment 102 and 103 fall within the coverage of the network device 101, however, this disclosure is not limited thereto. Neither of the terminal equipments 102, 103 may fall within the coverage of the network device 101, or the terminal equipment 102 may fall within the coverage of the network device 101 and the other terminal equipment 103 may fall outside the coverage of the network device 101.

In an embodiment of this disclosure, sidelink transmission may be performed between the two terminal equipments 102 and 103. For example, both the two terminal equipments 102 and 103 may perform sidelink transmission within the coverage of the network device 101 to perform V2X communications, or may perform sidelink transmission outside the coverage of the network device 101 to perform V2X communications. The terminal equipment 102 may perform sidelink transmission within the coverage of the network device 101 and the other terminal equipment 103 may perform sidelink transmission outside the coverage of the network device 101 to perform V2X communications.

In an embodiment of this disclosure, the terminal equipment 102 and/or 103 may autonomously select a sidelink resource (i.e., adopting a Mode 2), and in this case, the sidelink transmission may be independent of the network device 101, that is, the network device 101 is alternative. Of course, the embodiments of this disclosure may also combine an autonomous selection of sidelink resources (i.e., adopting the Mode 2) with an allocation of sidelink resources by the network device (i.e., adopting a Mode 1); however, this disclosure is not limited thereto.

In V2X, the terminal equipment may obtain sidelink transmission resources through a process of sensing detection+resource selection, in which sensing may be performed continuously to obtain an occupancy of resources in a resource pool. For example, the terminal equipment may estimate the occupancy of the resources in a later period of time (referred to as a selection window) according to the occupancy of the resources in a previous period of time (referred to as a sensing window).

In LTE V2X, the terminal equipment may support a resource selection mechanism of partial sensing.

Figure 2:
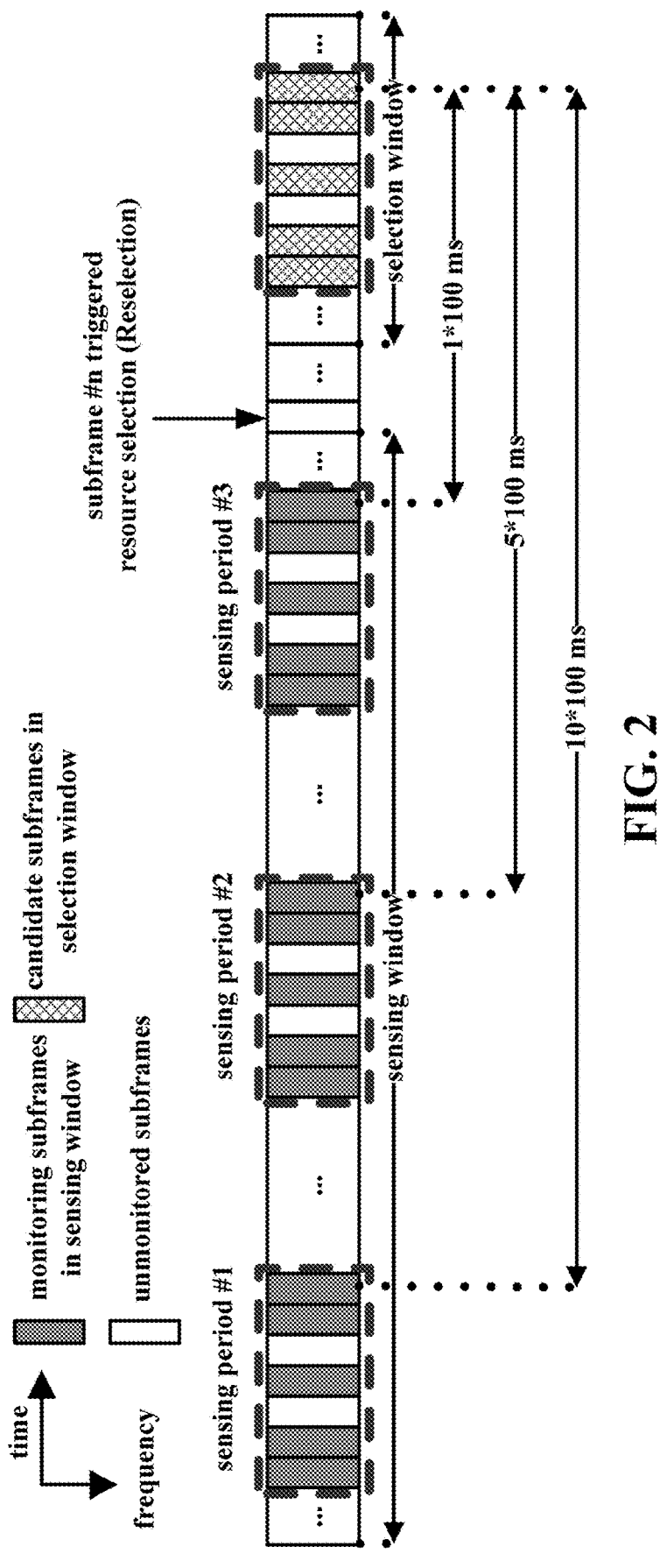
FIG. 2 is a schematic diagram illustrating a terminal equipment performing partial sensing.

FIG. 2 is a schematic diagram illustrating a terminal equipment performing partial sensing. As illustrated in FIG. 2, Y subframes may be selected in a corresponding selection window, and a transmission resource may be selected from candidate resources in the Y subframes. For example, Y is greater than or equal to a parameter minNumCandidateSF configured in a higher layer. Correspondingly, if a k-th bit is configured as 1 in a bitmap gapCandidateSensing configured in a higher layer, for a subframe included in a set of the selected Y subframes, a subframe corresponding to the k-th bit in the sensing window needs to be monitored. In short, only the subframes in the selection window to which some subframes monitored in the sensing window corresponds may be selected as subframes in the set of the Y subframes.

In NR V2X, it may be restricted that a candidate slot selected in the selection window is a slot monitored in a previous corresponding time domain position, in this way, interference to selected resources from periodic transmission performed by other terminal equipment in a same resource pool may be eliminated to guarantee reliable performance of the system, this type of partial sensing may be defined as periodic-based partial sensing. For the transmitting terminal equipment that performs the periodic-based partial sensing, a physical sidelink control channel (PSCCH) is detected in the monitoring slot corresponding to the selected candidate slot, that is, corresponding first stage sidelink control information ($1^{st}$ stage SCI) is detected to obtain the occupancy of the resources of other terminal equipment.

For example, if a slot $$t_y^{SL}$$

is selected and included in candidate slots (Y slots), the terminal equipment needs to monitor a corresponding slot $$t_{y-k \times P_{reserve}}^{SL},$$

the related art may be referred to for the definition of k and $P_{reserve}$. $P_{reserve}$ is a set of corresponding period values (i.e., values after the slot is converted into a logical slot) that need to be monitored for one candidate slot when the terminal equipment performs period-based partial sensing, and it may be a full set or a sub-set of a candidate period set configured by sl-ResourceReservePeriodList. The parameter sl-ResourceReservePeriodList included in the resource pool configures a candidate period value reserved by an allowed period of the resource pool. k is the number of periods between the candidate slots and the corresponding monitoring slot that needs to be monitored. For the selection of the k value, the closer to the time n when the resource selection occurs, or the closer to a first slot y0 in the Y candidate slots, the more reliable the obtained sensing result.

For the periodic reserved SCI monitored in $$t^{SL}_{y-k \times P_{reserve}}$$

(the indicated reservation period is $P_{reserve}$), if reference signal received power (RSRP) corresponding to the SCI is greater than a threshold and frequency domain resources indicated by the SCI correspond to resources R in a slot after k $P_{reserve}$ periods, candidate resources overlapped with the resources R in a current transmission period or a subsequent transmission period need to be excluded in the corresponding slot $$t^{SL}_{y}.$$

Figure 3:
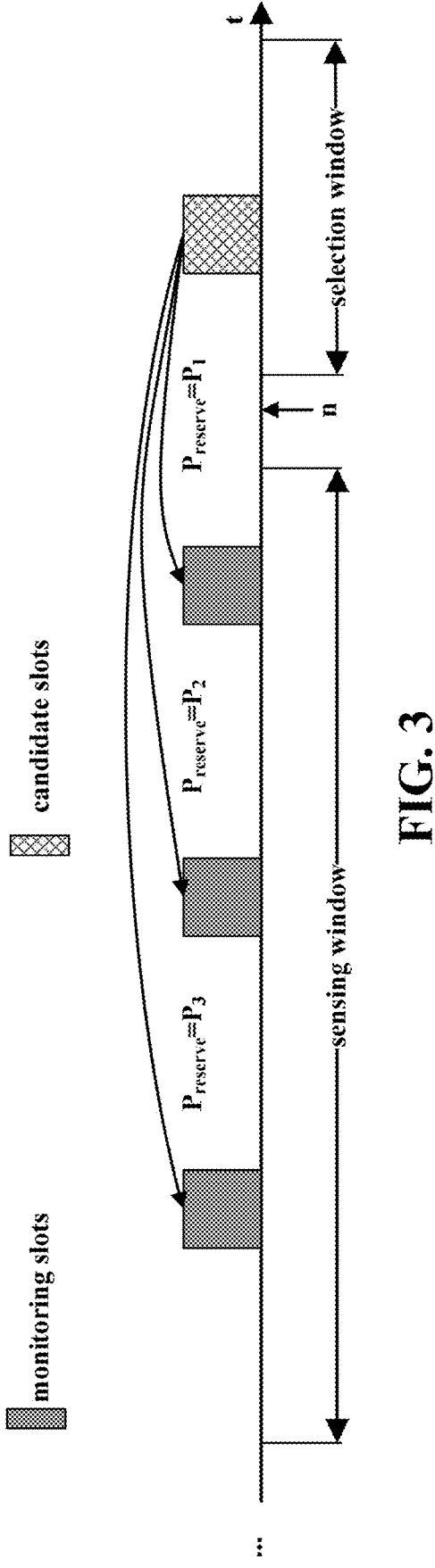
FIG. 3 is another schematic diagram illustrating a terminal equipment performing partial sensing.

FIG. 3 is another schematic diagram illustrating the terminal equipment performing partial sensing. As illustrated in FIG. 3, assuming that $P_{reserve}=\{P_1, P_2, P_3\}$, k=1. For each candidate slot, the terminal equipment may determine one or more corresponding k values for each $P_{reserve}$, respectively, so as to obtain a corresponding slot that needs to be monitored for the candidate slot.

The case of partial sensing is schematically illustrated above. The content in 8.1.4 in 3GPP TS 38.214 V16.4.0 may also be referred to for the process of sensing detection+ resource selection in NR V2X.

On the other hand, discontinuous reception (DRX) may be configured on a Uu link for the terminal equipment in an existing standard to enable the terminal equipment to save power. For example, a semi-static periodic running timer drx-OnDurationTimer may be configured for the terminal equipment. During the running period of this timer, the terminal equipment needs to perform a blind detection on a physical downlink control channel (PDCCH); and in the rest of the time, the terminal equipment may not detect the PDCCH, or may even turn off receiving radio frequency (RF) based on an implementation for the purpose of saving power.

On the basis of a DRX mechanism for semi-static periodic operation, Uu DRX also introduces an event-based operation timer, and may dynamically switch the terminal equipment to active time when conditions are met to perform the blind detection on the PDCCH. For example, drx-RetransmissionTimerDL and drx-RetransmissionTimerUL may be configured according to a hybrid automatic repeat request (HARD) process, so that the terminal equipment may be dynamically in the "Active" time, to detect the PDCCH that schedules retransmission on a downlink (DL) and an uplink (UL), respectively.

On the basis of the Uu DRX operation mechanism, the terminal equipment may be in an "Active" state when the base station may schedule retransmission, may ensure that the terminal equipment may detect and receive the PDCCH that schedules retransmission; meanwhile, in order to receive continuous data, after receiving control channel information corresponding to initial transmission data, the terminal equipment may start a drx-InactivityTimer to detect a possible subsequent transmission of initial transmission data, so as to ensure that the terminal equipment may detect and receive the PDCCH corresponding to consecutive initial transmission data packets.

In a Rel-17 sidelink topic, the sidelink transmission based on NR technology need to be further enhanced. One of the important objectives is to research and design a power-saving mechanism for some terminal equipment, such as a pedestrian UE (P-UE), on the sidelink. For a receiving terminal equipment, discontinuous reception (DRX) may be performed on the sidelink to achieve the effect of saving power. For the receiving terminal equipment configured with SL DRX, only the physical sidelink control channel (PSCCH) is detected within the corresponding DRX active time of the SL, that is, first stage sidelink control information ($1^{st}$ stage SCI) is detected, and a physical sidelink shared channel (PSSCH) is detected, that is, second stage sidelink control information ($2^{nd}$ stage SCI) is detected to receive data packets.

A terminal equipment (such as P-UE) may act as both a receiving UE and a transmitting UE. In Rel-17, the UE may perform partial sensing whilst SL DRX is configured. In this case, if one party does not consider a situation of the other party at all during design, a decline in power-saving effect may occur.

Figure 4:
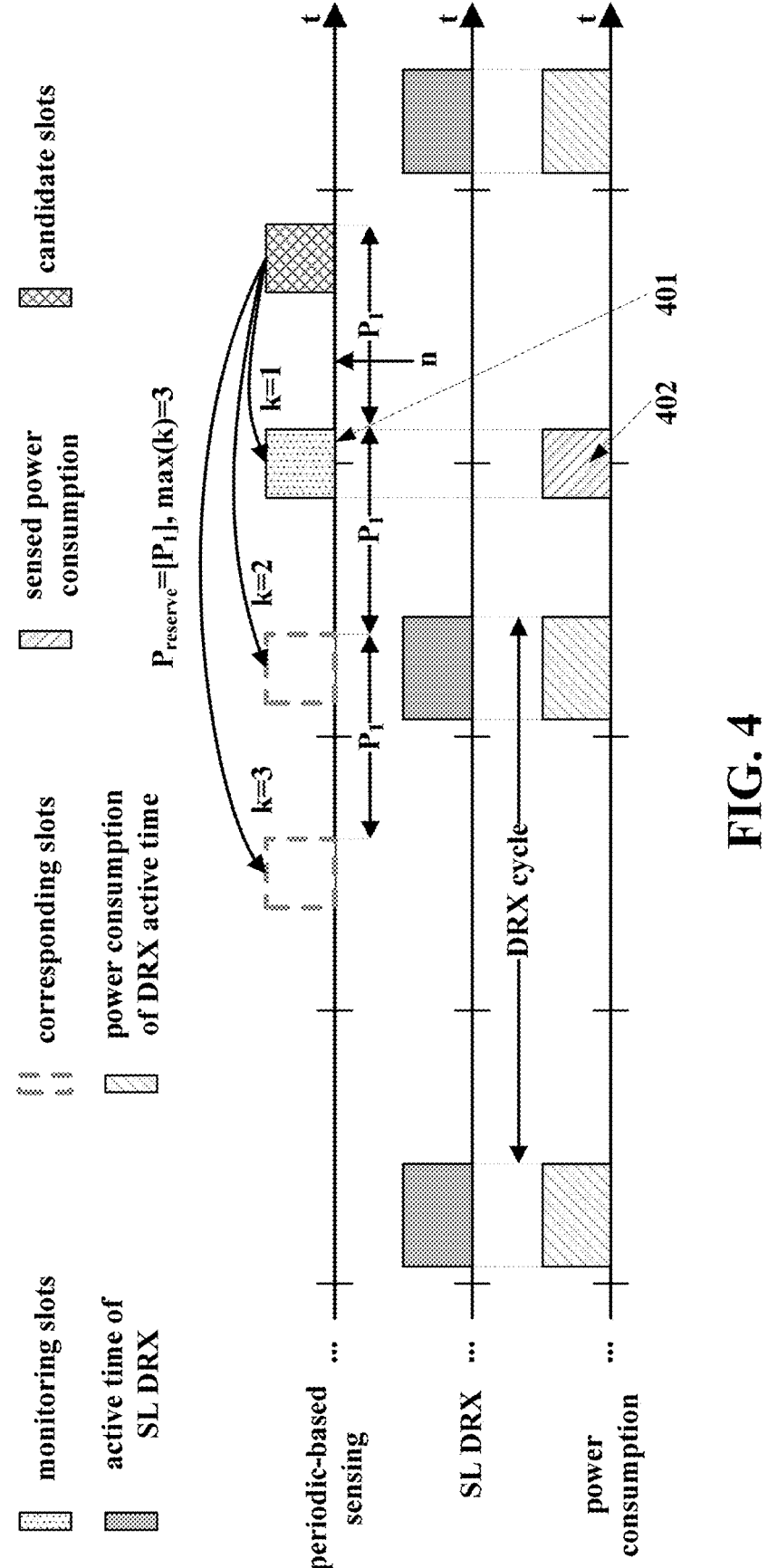
FIG. 4 is a schematic diagram illustrating additional power consumption according to an embodiment of this disclosure.

FIG. 4 is a schematic diagram illustrating additional power consumption according to an embodiment of this disclosure. The terminal equipment may perform partial sensing and is configured with SL DRX. As illustrated in FIG. 4, for one period $P_1$ configured in a resource pool, assuming that for a slot $$t^{SL}_{y-k \times P1}$$

corresponding to a candidate slot, k=1 (that is, adopting a sensing result of the closest period), and a corresponding monitoring slot is $$t^{SL}_{y-P1}.$$

However, at this time, monitoring slots (also Y slots, as illustrated in 401) corresponding to all candidate slots (Y slots) are not overlapped with the DRX active time, then on the basis of the DRX active time, the terminal equipment needs to additionally generate power consumption (as illustrated in 402) caused by monitoring the monitoring slots (as illustrated in 401) corresponding to the candidate slots (Y slots).

In view of one of the above problems, embodiments of this disclosure are further described below.

In an embodiment of this disclosure, the sidelink is illustrated by taking V2X as an example, however, this disclosure is not limited thereto, and may also be applied to a sidelink transmission scenario other than the V2X. In the description below, the terms "sidelink" and "V2X" are interchangeable, the terms "PSFCH" and "sidelink feedback channel" are interchangeable, the terms "PSCCH" and "sidelink control channel" or "sidelink control information"

are interchangeable, and the terms "PSSCH" and "sidelink data channel" or "sidelink data" are interchangeable, in the absence of confusion.

In addition, transmitting or receiving the PSCCH may be understood as transmitting or receiving sidelink control information carried by the PSCCH; transmitting or receiving the PSSCH may be understood as transmitting or receiving sidelink data carried by the PSSCH; transmitting or receiving the PSFCH may be understood as transmitting or receiving sidelink feedback information carried by the PSFCH. Sidelink transmission (also referred to as sidelink transmission) may be understood as PSCCH/PSSCH transmission or sidelink data/information transmission.

Embodiments of a First Aspect

The embodiments of this disclosure provide a method for selecting a sidelink resource. Taking a candidate slot in a selection window as an example, description is given from a terminal equipment that supports DRX of a sidelink and partial sensing of the sidelink. The terminal equipment may transmit sidelink data to other terminal equipment, thus the terminal equipment needs to perform resource selection to determine transmission resources of the sidelink data. In addition, the terminal equipment may also act as a receiving device.

FIG. 5 is a schematic diagram illustrating a method for selecting a sidelink resource according to an embodiment of this disclosure. As illustrated in FIG. 5, the method includes:

501: a terminal equipment determines one or more monitoring slots for performing sidelink partial sensing for a candidate slot according to configuration information of the sidelink discontinuous reception (DRX);

502: monitoring is performed on sidelink control information at the monitoring slots; and

503: resource selection is performed according to a monitoring result.

It should be noted that the FIG. 5 only schematically illustrates an embodiment of this disclosure, however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 5.

In an embodiment of this disclosure, the terminal equipment may configure or pre-configure sidelink DRX. Specifically, for example, the terminal equipment may be in an active or on state on the sidelink, and in this state, the terminal equipment performs a PSCCH detection in a corresponding receiving resource pool; the terminal equipment may also be in an inactive or off state on the sidelink, in this state, the terminal equipment does not perform any PSCCH detection in the corresponding receiving resource pool. However, this disclosure is not limited thereto. The related art may also be referred to for the DRX mechanism. The terminal equipment may also perform partial sensing, including but not limited to period-based partial sensing.

Since the PSCCH ($1^{st}$ stage SCI) and PSSCH ($2^{nd}$ stage SCI) need to be detected during the DRX active time for reception of sidelink data, and the sidelink sensing only needs to detect the PSCCH ($1^{st}$ stage SCI), sensing may be performed within the DRX active time.

In some embodiments, the configuration information of the DRX of the sidelink is at least used to determine the DRX active time of the sidelink, the active time of sidelink DRX includes at least one of: a running time of a sidelink OnDuration timer, a running time of an inactive timer or a running time of a retransmission timer; however, this disclosure is not limited thereto.

In some embodiments, determining a monitoring slot corresponding to a candidate slot at least includes: determining one or more periods and corresponding coefficients; and for one period, taking the candidate slot as a monitoring slot to which the one period corresponds after translating the candidate slot forward by P*k slots in a time domain, where P is the number of slots after the period is converted into a logical slot, and k is a coefficient corresponding to the period. The one or more periods are all or part of sidelink reservation period candidate values configured in a resource pool.

For example, for each slot $$t_y^{SL}$$

in candidate slots (Y slots), a period value $P_m$ (a whole set is $P_{reserve}$) that needs to be monitored and contained in a sl-ResourceReservePeriod List or a subset thereof, a k value thereof may be different. For a candidate slot $$t_y^{SL},$$

a corresponding slot that needs to be monitored is $$t_{y-k \times P_{reserve}}^{SL};$$

and for each period value that needs to be monitored in $P_{reserve}$ (corresponding to a full set or a sub-set of sl-ResourceReservePeriodList), a corresponding k value is determined, respectively.

For one period, $P_{rsvp}$ in milliseconds may be converted to $P'_{rsvp}$ in a logical slot, as indicated in Equation (1) below:

$$P'_{rsvp} = \left\lceil \frac{N}{20 \text{ ms}} \times P_{rsvp} \right\rceil \tag{1}$$

where, N is the number of slots that may be used for sidelink transmission within 20 ms. A conversion between slots and milliseconds is only schematically illustrated above, and the related art may also be referred to for the specific content.

In some embodiments, for one period of which a candidate slot is determined that a corresponding slot needs to be monitored, the corresponding coefficients are determined from a plurality of candidate values as the following value that: the monitoring slot to which the candidate slot corresponds is made to be the active time of the sidelink discontinuous reception. For example, for the reservation period Pm, a monitoring slot $$t_{y-k \times Pm}^{SL}$$

corresponding to the candidate slot $$t_y^{SL}$$

is overlapped with the active time of the SL DRX.

Figure 6:
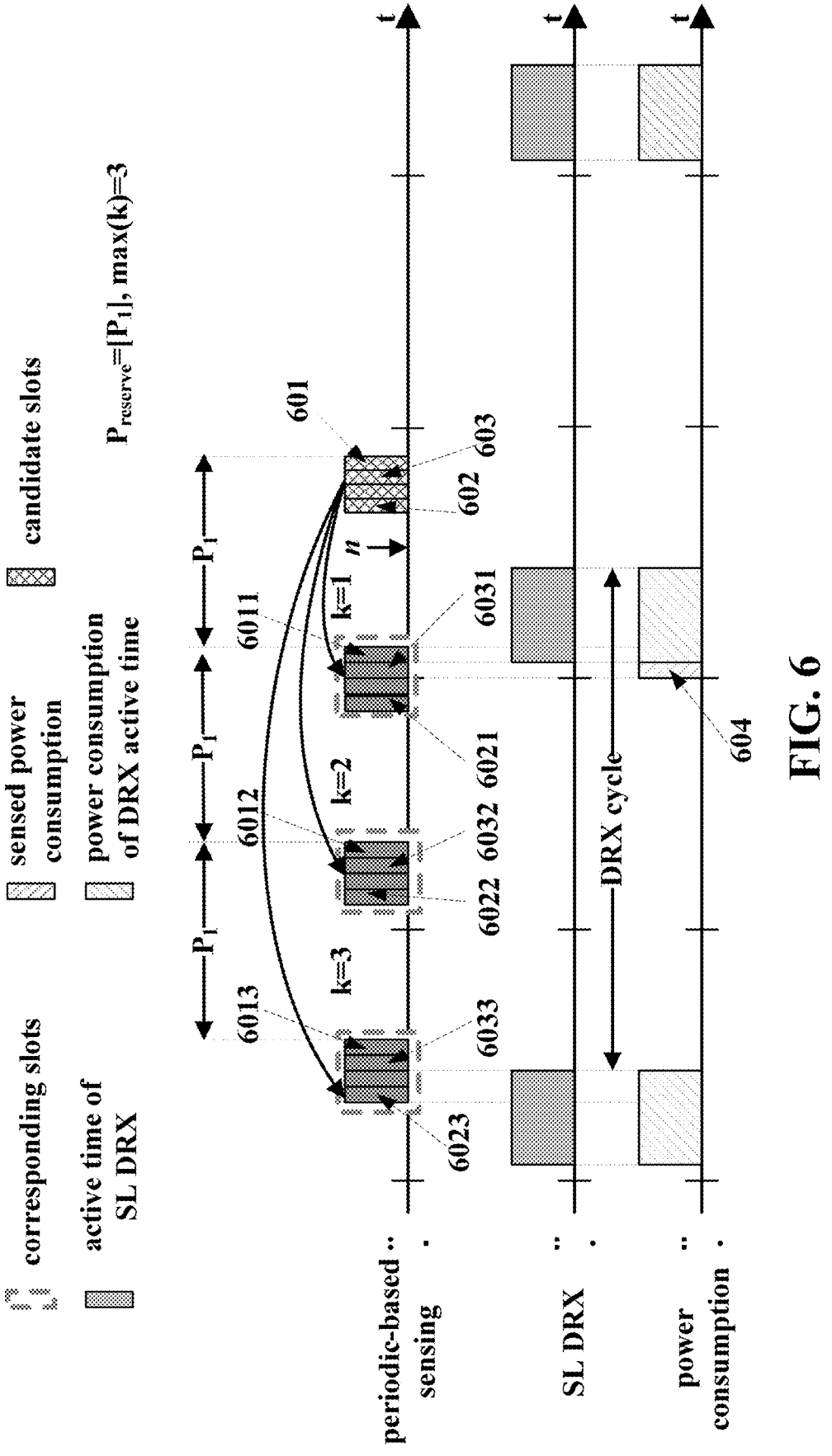
FIG. 6 is an example diagram illustrating a determination coefficient according to an embodiment of this disclosure.

FIG. 6 is an example diagram illustrating a determination coefficient k according to an embodiment of this disclosure, which is illustrated by taking one period $P_1$ included in a $P_{reserve}$ set as an example. For example, as illustrated in FIG. 6, for the determined candidate slot $$t_y^{SL}$$

(as illustrated in 601) (e.g., Y candidate slots in total), when k=1, a corresponding slot is $$t_{y-2\times P1}^{SL}$$

(as illustrated in 6011), overlapped with the active time of the SL DRX, when k=2, a corresponding slot is $$t_{y-2\times P1}^{SL}$$

(as illustrated in 6012), not overlapped with the active time of the SL DRX, when k=3, a corresponding slot is t $$t_{y-3\times P1}^{SL}$$

(as illustrated in 6013), not overlapped with the active time of the SL DRX. Therefore, for this candidate slot $$t_y^{SL}$$

(as illustrated in 601), a k value is determined to be 1, and a corresponding slot that needs to be monitored is $$t_y^{SL}$$

(as illustrated in 6011).

In this example, the monitoring slot $$t_{y-1\times P1}^{SL}$$

corresponding to the candidate slot $$t_{y-P1}^{SL}$$

is the active time of the SL DRX, and therefore, no additional power consumption is increased and the power-saving effect may be improved.

For another example, as illustrated in FIG. 6, for the determined candidate slot $$t_{y'}^{SL}$$

(as illustrated in 602), when k=1, a corresponding slot is $$t_{y'-1\times P1}^{SL}$$

(as illustrated in 6021), not overlapped with the active time of the SL DRX, when k=2, a corresponding slot is $$t_{y'-2\times P1}^{SL}$$

(as illustrated in 6022), not overlapped with the active time of the SL DRX, when k=3, a corresponding slot is $$t_{y'-3\times P1}^{SL}$$

(as illustrated in 6023), not overlapped with the active time of the SL DRX. Therefore, for this candidate slot $$t_{y'}^{SL}$$

(as illustrated in 602), a k value is determined to be 3, and a corresponding slot that needs to be monitored is $$t_{y'-3\times P1}^{SL}$$

(as illustrated in 6023).

In this example, the monitoring slot $$t_{y'-3\times P1}^{SL}$$

corresponding to the candidate slot $$t_{y'}^{SL}$$

is the active time of the SL DRX, and therefore, no additional power consumption is increased and the power-saving effect may be improved.

In some embodiments, for one period of which a candidate slot is determined that a corresponding slot needs to be monitored, in a case where none of corresponding coefficient candidate values is able to make the monitoring slot to which the candidate slot corresponds be the active time of the sidelink discontinuous reception, the corresponding coefficients are determined as the following value that: an interval between the monitoring slot and a reference time is made to be minimal and the interval is greater than or equal to a first threshold.

For example, the reference time is a triggering time of resource selection (e.g., n illustrated in FIG. 6), or is one of one or more candidate slots (e.g., a first slot y0 among the Y slots), however, this disclosure is not limited thereto. The first threshold may be predefined, for example, may be a maximum processing time or a minimum processing time or a specific processing time of the terminal equipment.

Still taking FIG. 6 as an example, for example, for the determined candidate slot $$t_{y''}^{SL}$$

(as illustrated in 603), when k=1, a corresponding slot is $$t_{y''-1\times P1}^{SL}$$

(as illustrated in 6031), not overlapped with the active time of the SL DRX, when k=2, a corresponding slot is $$t_{y''-2\times P1}^{SL}$$

(as illustrated in 6032), not overlapped with the active time of the SL DRX, when k=3, a corresponding slot is $$t_{y''-3\times P1}^{SL}$$

(as illustrated in 6033), not overlapped with the active time of the SL DRX. Therefore, for this candidate slot $$t_{y''}^{SL}$$

(as illustrated in 603), a k value is determined to be 1 (a interval between the monitoring slot $$t_{y''-P1}^{SL}$$

and a reference time n or y0 is minimal and the interval is greater than or equal to the first threshold), a corresponding slot that needs to be monitored is $$t_{y''-P1}^{SL}$$

(as illustrated in 6031).

In this example, assuming that $$t_{y''-P1}^{SL}$$

may be monitored during the non-active-time, and monitoring in the slot closest to the reference time may improve the accuracy of monitoring, and may perform the resource selection in a more accurate manner and may improve the reliability of resource selection.

In some embodiments, for one period of which a candidate slot is determined that a corresponding slot needs to be monitored, the corresponding coefficients are determined from a plurality of candidate values as the following value that: a monitoring slot to which the candidate slot corresponds is the active time of the sidelink discontinuous reception, and an interval between the monitoring slot and a reference time is made to be minimal and the interval is greater than or equal to a first threshold.

Figure 7:
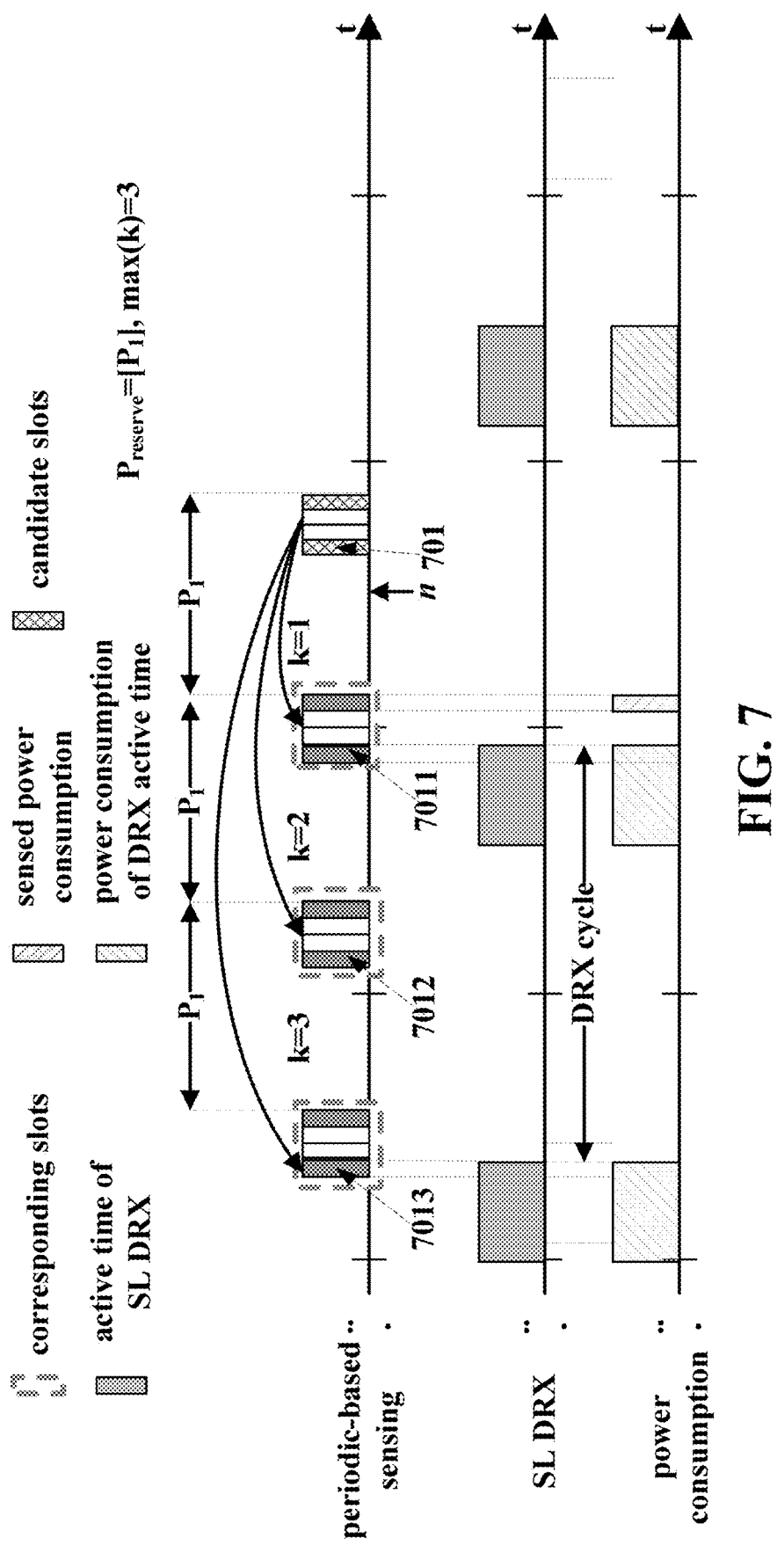
FIG. 7 is another example diagram illustrating a determination coefficient according to an embodiment of this disclosure.

FIG. 7 is another example diagram illustrating a determination coefficient according to an embodiment of this disclosure, which is illustrated by taking one period $P_1$ included in a $P_{reserve}$ set as an example. For example, as illustrated in FIG. 7, for the determined candidate slot $$t_y^{SL}$$

(as illustrated in 701), when k=1, a corresponding slot is $$t_{y-1\times P1}^{SL}$$

(as illustrated in 7011), overlapped with the active time of the SL DRX, when k=2, a corresponding slot is $$t_{y-2\times P1}^{SL}$$

(as illustrated in 7012), not overlapped with the active time of the SL DRX, when k=3, a corresponding slot is $$t_{y-3\times P1}^{SL}$$

(as illustrated in 7013), overlapped with the active time of the SL DRX. Therefore, for this candidate slot $$t_y^{SL}$$

(as illustrated in 701), a k value is determined to be 1 (an interval between the monitoring slot $$t_{y-P1}^{SL}$$

and a reference time n or y0 is minimal and the interval is greater than or equal to a first threshold), a corresponding slot that needs to be monitored is $$t_{y-P1}^{SL}$$

(as illustrated in 7011).

In this example, the monitoring slot $$t_{y-1\times P1}^{SL}$$

15                                                          16 corresponding to the candidate slot $$t_y^{SL}$$

is the active time of the SL DRX, and therefore, no addi-
tional power consumption is increased and the power-saving
effect may be improved. In addition, monitoring in the slot
closest to the reference time may improve the accuracy of
monitoring, and may perform the resource selection in a
more accurate manner and may improve the reliability of
resource selection.

In some embodiments, a plurality of candidate values of
the coefficient k is/are configured or pre-configured, or a
maximum value of the plurality of candidate values of the
coefficient k is configured or pre-configured.

For example, a candidate value of k may be configured or
pre-configured in a resource pool, or a maximum value of k
may be configured or pre-configured in the resource pool,
then k may only be taken within a range of candidate values,
or taken within a range of candidate values less than or equal
to the maximum value. In the examples illustrated in FIGS.
6 and 7, the maximum value of k is 3, and the candidate
values are {1, 2, 3}.

The description is given above by taking a single value of
k as an example; however, this disclosure is not limited
thereto. A plurality of values may also be taken for k, that is,
for one candidate slot and one period in a corresponding
$P_{reserve}$ candidate set, the specific number of times in which
the corresponding slot needs to be monitored before the
resource selection trigger or before the first slot of the
candidate slot set is greater than 1, and the number of times
may be predefined or configured or pre-configured in the
resource pool. For example, for one period included in the
$P_{reserve}$ set, when two values are taken for k, one k value is
first determined according to the embodiment, and then the
above steps are repeated to determine a different k value.

For example, in FIG. 6, for one period $P_1$ included in the
$P_{reserve}$ set, the corresponding monitoring slot is first deter-
mined to be $$t_{y-P1}^{SL}$$

(as illustrated in 6011, then k=1), and the above steps may
be performed again. Since the slot $$t_{y-2\times P1}^{SL}$$

(as illustrated in 6012) and the slot $$t_{y-3\times P1}^{SL}$$

(as illustrated in 6013) are not overlapped with the active
time of the SL DRX, the corresponding monitoring slot may
be determined to be $$t_{y-2\times P1}^{SL}$$

(as illustrated in 6012, then k=2) which is closer to the
reference time). In this case, k=[1,2].

For another example, in FIG. 7, the corresponding slot
that needs to be monitored is first determined to be $$t_{y-P1}^{SL}$$

(as illustrated in 7011, then k=1), and the above steps may
be performed again. Since the slot $$t_{y-3\times P1}^{SL}$$

(as illustrated in 7013) is overlapped with the active time of
the SL DRX, the corresponding monitoring slot may be
determined to be $$t_{y-3\times P1}^{SL}$$

(as illustrated in 7013, then k=3). In this case, k=[1, 3].

In an embodiment of this disclosure, after a corresponding
k value is determined for each period included in the $P_{reserve}$,
respectively, a corresponding slot $$t_{y-k\times Preserve}^{SL}$$

needs to be monitored for a candidate slot $$t_y^{SL};$$

for the periodic reserved SCI monitored in the slot $$t_{y-k\times Preserve}^{SL}$$

(the indicated reservation period is $P_{reserve}$), if an RSRP
strength of DMRS of the PSCCH or PSSCH corresponding
to the SCI is greater than the threshold and frequency
domain resources indicated by the SCI correspond to the
resources R in a slot after k $P_{reserve}$ periods candidate
resources overlapped with the resources R in a current
transmission period or a subsequent transmission period
need to be excluded in the corresponding slot $$t_y^{SL}.$$

In the above example, the terminal equipment may per-
form monitoring at non-active-time of the SL DRX, thereby
obtaining a sensing result, and the terminal equipment may
monitor the slots that need to be monitored corresponding to
the candidate slots; however, this disclosure is not limited
thereto.

In some embodiments, if for one period value $P_m$ that
needs to be monitored corresponding to one candidate slot (a
whole set is $P_{reserve}$), none of the alternative k values is able to make the corresponding monitoring slot be overlapped with the configured active time of the SL DRX, there is no need to monitor the candidate slot before this period.

For example, for the candidate slot $$t_{y''}^{SL}$$

(as illustrated in 603) in FIG. 6, since when k=1, a corresponding slot is $$t_{y''-P1}^{SL}$$

(as illustrated in 6031), not overlapped with the active time of the SL DRX, when k=2, a corresponding slot is $$t_{y''-2\times P1}^{SL}$$

(as illustrated in 6032), when k=3, a corresponding slot is $$t_{y''-3\times P1}^{SL}$$

(as illustrated in 6033), not overlapped with the active time of the SL DRX, then the slot $$t_{y''-P1}^{SL}$$

(as illustrated in 6031) is not monitored, that is, the period corresponding to the candidate slot is not monitored. Compared with the embodiment illustrated in FIG. 6, the power consumption corresponding to this embodiment (as illustrated in 604) is omitted.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It may be known from the embodiments that for the terminal equipment supporting the sidelink DRX and the sidelink partial sensing, one or more monitoring slots for performing the partial sensing of the sidelink is/are determined for one candidate slot according to the configuration information of the sidelink DRX. Therefore, considering a situation in which the terminal equipment acts as both a transmitting device and a receiving device, power may be further saved and the power-saving effect of the terminal equipment may be improved.

Embodiments of a Second Aspect

The embodiments of this disclosure provide a method for selecting a sidelink resource. Taking a plurality of candidate slots in a selection window as an example, description is given from a terminal equipment that supports sidelink DRX and sidelink partial sensing. The terminal equipment may transmit sidelink data to other terminal equipment, thus the terminal equipment needs to perform resource selection to determine transmission resources of the sidelink data. In addition, the terminal equipment may also act as a receiving device.

FIG. 8 is a schematic diagram illustrating a method for selecting sidelink resources according to an embodiment of this disclosure. As illustrated in FIG. 8, the method includes:

801: a terminal equipment determines one or more monitoring slots for performing sidelink partial sensing for each of a plurality of candidate slots according to configuration information of sidelink discontinuous reception (DRX);

802: monitoring is performed on sidelink control information at the monitoring slots; and

803: resource selection is performed according to a monitoring result.

It should be noted that the FIG. 8 only schematically illustrates the embodiment of this disclosure, however, this disclosure is not limited thereto. For example, an order of execution of the operations may be appropriately adjusted, and furthermore, some other operations may be added or some operations therein may be reduced. And appropriate variants may be made by those skilled in the art according to the above contents, without being limited to what is contained in FIG. 8.

In an embodiment of this disclosure, the terminal equipment may configure or pre-configure the DRX of the sidelink. Specifically, for example, the terminal equipment may be in an active or on state on the sidelink, and in this state, the terminal equipment performs a PSCCH detection in a corresponding receiving resource pool; the terminal equipment may also be in an inactive or off state on the sidelink, in this state, the terminal equipment does not perform any PSCCH detection in the corresponding receiving resource pool. However, this disclosure is not limited thereto. The related art may also be referred to for the DRX mechanism. The terminal equipment may also perform partial sensing, including but not limited to period-based partial sensing.

In some embodiments, the configuration information of the sidelink DRX is at least used to determine the active time of the sidelink DRX, the active time of the sidelink DRX includes at least one of: a running time of a sidelink OnDuration timer, a running time of an inactive timer or a running time of a retransmission timer; however, this disclosure is not limited thereto.

In some embodiments, determining a monitoring slot corresponding to each of a plurality of candidate slots is configured for: determining one or more periods and corresponding coefficients of a candidate slot set formed of the plurality of candidate slots, wherein the coefficients of the plurality of candidate slots for one period are identical; and for one period, taking the candidate slot as a monitoring slot to which the one period corresponds after translating the candidate slot set forward by P*k slots in a time domain, where P is the number of slots after the period is converted into a logical slot, and k is a coefficient corresponding to the period. The one or more periods are all or part of sidelink reservation period candidate values configured in a resource pool.

For example, for each slot $$t_y^{SL}$$

in the candidate slots (Y slots), a period value $P_m$ (a whole set is $P_{reserve}$) that needs to be monitored is included in a sl-ResourceReservePeriod List or a subset thereof, a "k" value thereof may be the same. For a candidate slot $$t_y^{SL},$$

a corresponding slot that needs to be monitored is $$t_{y-k \times P_{reserve}}^{SL},$$

and for each period value that needs to be monitored in $P_{reserve}$ (corresponding to a full set or a sub-set of sl-ResourceReservePeriodList), a corresponding "k" value is determined, respectively, and is the same for each slot $$t_y^{SL}.$$

For one period, $P_{rsvp}$ in milliseconds may be converted to $P'_{rsvp}$ in a logical slot, as indicated in Equation (1) below:

$$P'_{rsvp} = \left\lceil \frac{N}{20 \text{ ms}} \times P_{rsvp} \right\rceil \tag{1}$$

where, N is the number of slots that may be used for sidelink transmission within 20 ms. A conversion between slots and milliseconds is only schematically illustrated above, and the related art may also be referred to for the specific content.

In some embodiments, for one period of which a candidate slot set is determined that a corresponding slot needs to be monitored, the corresponding coefficients are determined from a plurality of candidate values as the following value that: the monitoring slot set to which the candidate slot set corresponds is made to at least partially overlap with the active time of the sidelink discontinuous reception.

Figure 9:
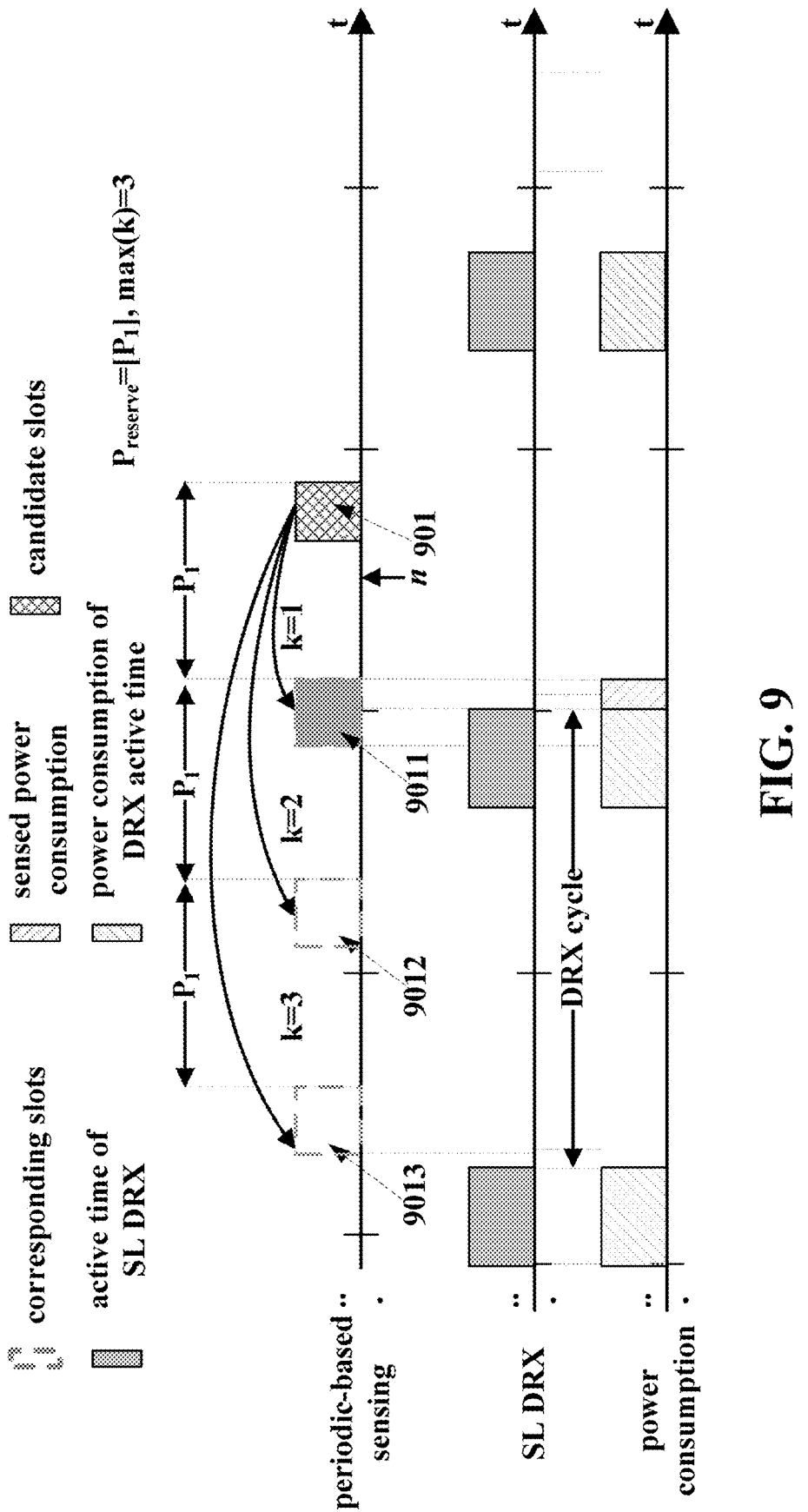
FIG. 9 is another example diagram illustrating a determination coefficient according to an embodiment of this disclosure.

FIG. 9 is an example diagram illustrating a determination coefficient according to an embodiment of this disclosure, which is illustrated by taking one period $P_1$ included in a $P_{reserve}$ set as an example. For example, as illustrated in FIG. 9, for a candidate slot $$t_y^{SL}$$

included in a candidate slot set (Y candidate slots, as illustrated in 901), when k=1, a monitoring slot corresponding to the candidate slot $$t_y^{SL} \text{ is } t_{y-1 \times P1}^{SL},$$

which is included in a monitoring slot set corresponding to the candidate slot set, and a monitoring slot set (as illustrated in 9011) corresponding to the candidate slot set is partially overlapped with the active time of the SL DRX; when k=2, a monitoring slot corresponding to the candidate slot $$t_y^{SL} \text{ is } t_{y-2 \times P1}^{SL},$$

which is included in the monitoring slot set corresponding to the candidate slot set, and a monitoring slot set (as illustrated in 9012) corresponding to the candidate slot set is not overlapped with the active time of the SL DRX; when k=3, a monitoring slot corresponding to the candidate slot $$t_y^{SL} \text{ is } t_{y-3 \times P1}^{SL},$$

which is included in the monitoring slot set corresponding to the candidate slot set, and a slot set (as illustrated in 9013) corresponding to the candidate slot set is not overlapped with the active time of the SL DRX. Therefore, for the candidate slot set (as illustrated in 901) containing the candidate slot $$t_y^{SL},$$

the k value is determined to be 1, and the corresponding slot set that needs to be monitored is illustrated in 9011.

In this example, monitoring may be performed during at least part of the active time, and thus no excessive additional power consumption may be increased, and the power-saving effect may be improved.

In some embodiments, for one period of which the candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold.

For another example, assuming that the second threshold is 2, a slot set illustrated in 9011 is partially overlapped with the active time of the SL DRX (e.g., one slot is overlapped), and a slot set illustrated in 9013 is partially overlapped with the active time of the SL DRX (e.g., three slots are overlapped), only the slot set as illustrated in 9013 satisfies a slot overlapping condition (greater than the second threshold), then the k value is determined to be 3.

In some embodiments, for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and the number of overlapped slots is maximal.

Figure 10:
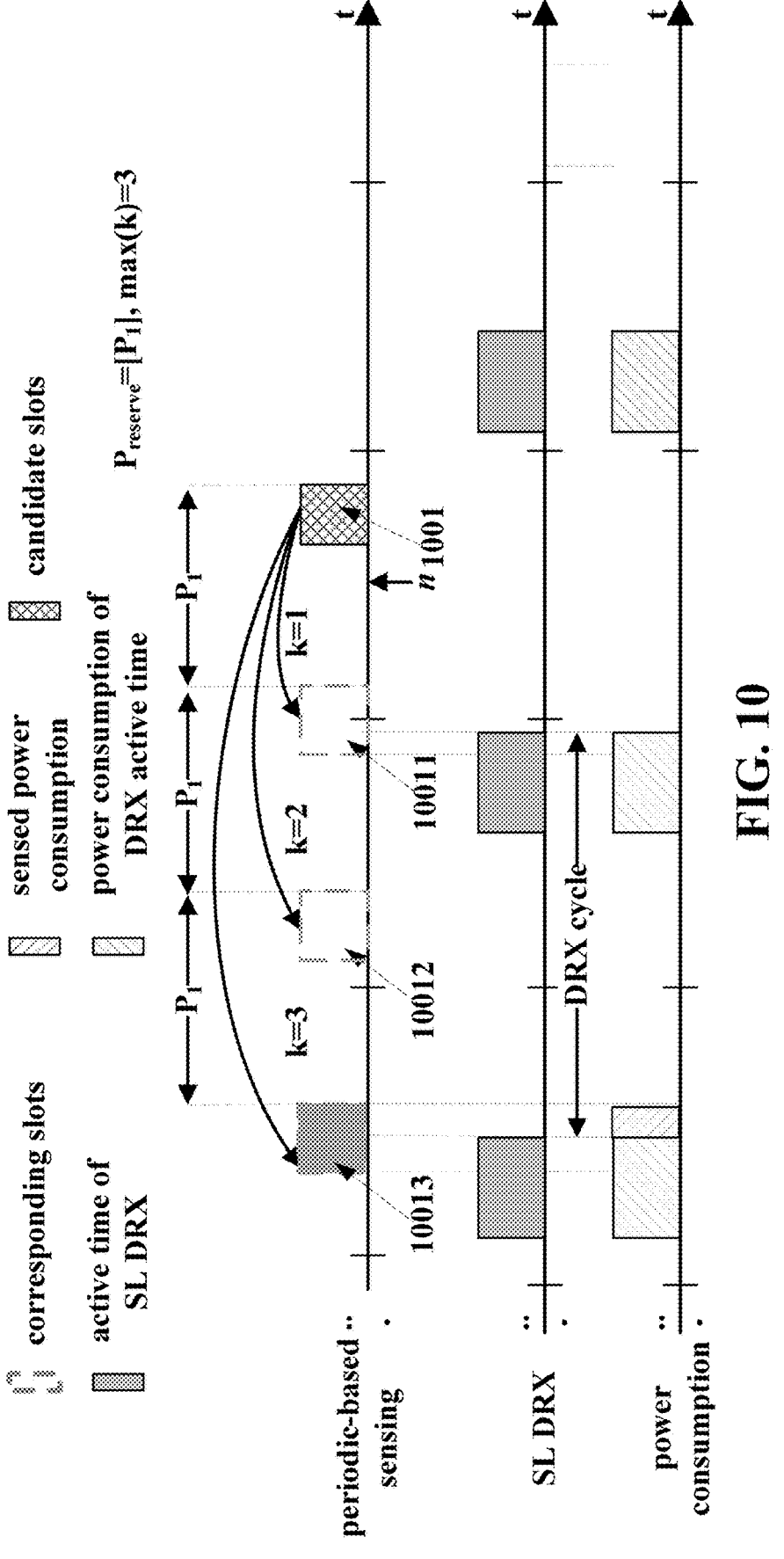
FIG. 10 is another example diagram illustrating a determination coefficient according to an embodiment of this disclosure.

FIG. 10 is another example diagram illustrating a determination coefficient according to an embodiment of this disclosure, which is illustrated by taking one period $P_1$ included in a $P_{reserve}$ set as an example. For example, as illustrated in FIG. 10, for a candidate slot $$t_y^{SL}$$

included in a candidate slot set (Y candidate slots, as illustrated in 1001), when k=1, a monitoring slot corresponding to the candidate slot $$t_y^{SL} \text{ is } t_{y-1 \times P1}^{SL},$$

which is included in a monitoring slot set corresponding to the candidate slot set, and a slot set (as illustrated in 10011) corresponding to the candidate slot set is partially overlapped with the active time of the SL DRX (e.g., two slots are overlapped); when k=2, a monitoring slot corresponding to the candidate slot $$t_y^{SL} \text{ is } t_{y-2 \times P1}^{SL},$$

which is included in the monitoring slot set corresponding to the candidate slot set, and a slot set (as illustrated in 10012) corresponding to the candidate slot set is not overlapped with the active time of the SL DRX; when k=3, a monitoring slot corresponding to the candidate slot $$t_y^{SL} \text{ is } t_{y-3 \times P1}^{SL},$$

which is included in the monitoring slot set corresponding to the candidate slot set, and a slot set (as illustrated in 10013) corresponding to the candidate slot set is partially overlapped with the active time of the SL DRX (e.g., four slots are overlapped). Therefore, for a candidate slot set (as illustrated in 1001) containing the candidate slot $$t_y^{SL},$$

the k value is determined to be 3, and the corresponding slot set that needs to be monitored is illustrated in 10013.

In this example, monitoring may be performed at the DRX active time as much as possible; and therefore, no excessive additional power consumption is increased, and the power-saving effect may be improved.

In some embodiments, for one period of which the candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold and the number of overlapped slots is maximal.

For another example, assuming that the second threshold is 2, a slot set indicated in 10011 is partially overlapped with the active time of the SL DRX (e.g., one slot is overlapped), and a slot set illustrated in 10012 is partially overlapped with the active time of the SL DRX (e.g., three slots are overlapped), a slot set illustrated in 10013 is partially overlapped with the active time of the SL DRX (e.g., four slots are overlapped), the slot set illustrated in 10012 and the slot set illustrated in 10013 meet a condition of overlapped slots (greater than the second threshold). Then, a slot set illustrated in 11012 and a slot set illustrated in 11013 are selected, and a slot set with a maximum number of overlapped slots is selected, that is, the k value is determined to be 3.

In some embodiments, for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and an interval between a last slot in the monitoring slot set and a reference time to be minimal and the interval to be greater than or equal to a first threshold.

Figure 11:
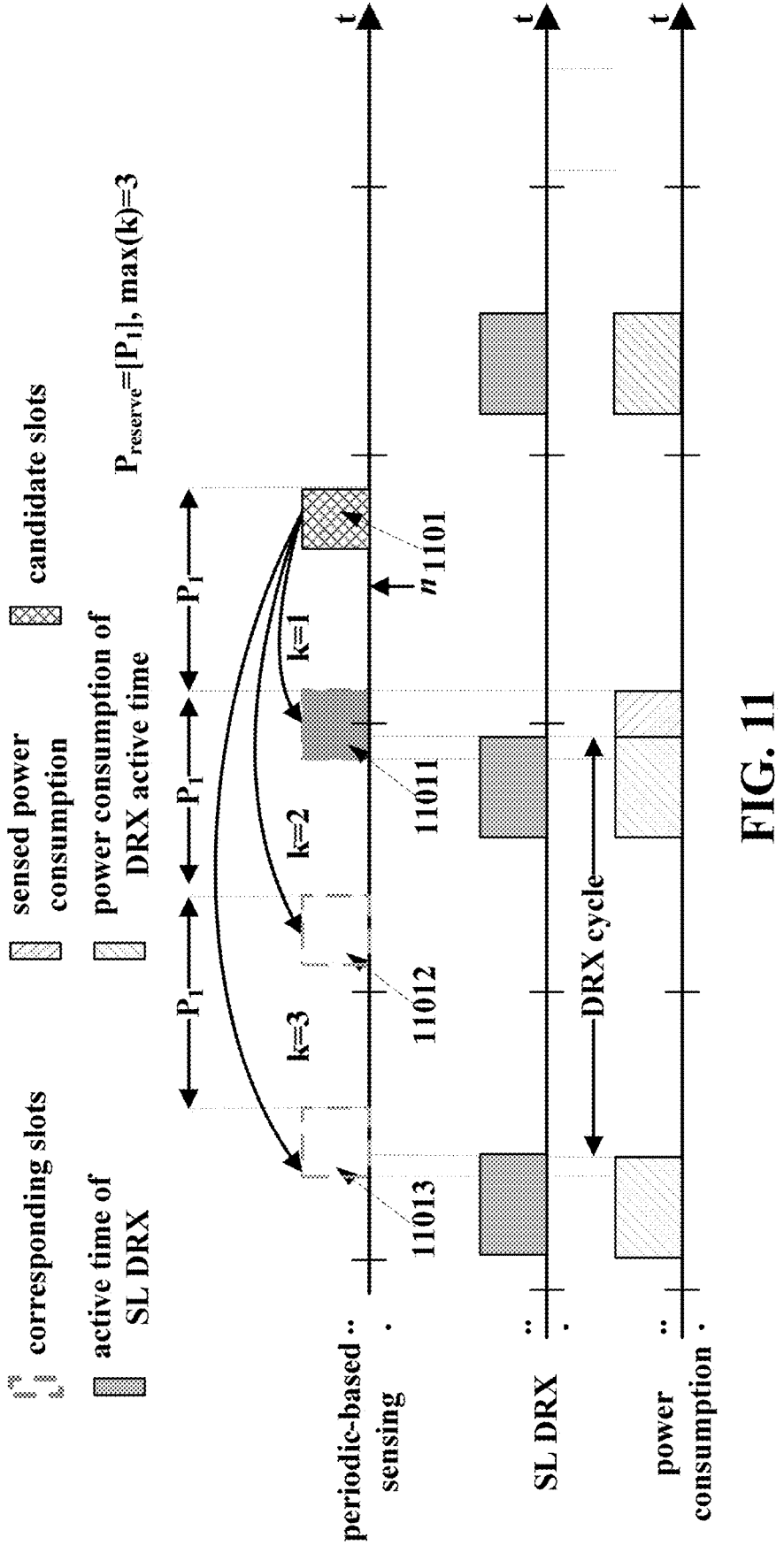
FIG. 11 is another example diagram illustrating a determination coefficient according to an embodiment of this disclosure.

FIG. 11 is another example diagram illustrating a determination coefficient according to an embodiment of this disclosure, which is illustrated by taking one period $P_1$ included in a $P_{reserve}$ set as an example, in which no second threshold is set. For example, as illustrated in FIG. 11, for a candidate slot $$t_y^{SL}$$

included in a candidate slot set (Y candidate slots, as illustrated in 1101), when k=1, a monitoring slot corresponding to the candidate slot $$t_y^{SL} \text{ is } t_{y-1 \times P1}^{SL},$$

which is included in the monitoring slot set corresponding to the candidate slot set, and a slot set (as illustrated in 11011) corresponding to the candidate slot set is partially overlapped with the active time of the SL DRX (e.g., two slots are overlapped); when k=2, a monitoring slot corresponding to the candidate slot $$t_y^{SL} \text{ is } t_{y-2 \times P1}^{SL},$$

which is included in the monitoring slot set corresponding to the candidate slot set, and a slot set (illustrated in 11012) corresponding to the candidate slot set is not overlapped with the active time of the SL DRX; when k=3, a monitoring slot corresponding to the candidate slot $$t_y^{SL} \text{ is } t_{y-3 \times P1}^{SL},$$

which is included in the monitoring slot set corresponding to the candidate slot set, and a slot set (illustrated in 11013) corresponding to the candidate slot set is partially overlapped with the active time of the SL DRX (e.g., two slots are overlapped). Therefore, for the candidate slot set (as illustrated in 1101) containing the candidate slot $$t_y^{SL},$$

the k value is determined to be 1 (an interval between the monitoring slot $$t_{y-P1}^{SL}$$

and a reference time n or y0 is minimal and the interval is greater than or equal to a first threshold), a corresponding slot set that needs to be monitored is illustrated in 11011.

In this example, the slots that need to be monitored may be at least partially overlapped with the active time of the SL DRX, and the number of overlapped slots may be increased as much as possible, thus no excessive additional power consumption is increased and the power-saving effect may be improved. In addition, monitoring in the slot closest to the reference time may improve the accuracy of monitoring, and may perform the resource selection in a more accurate manner and may improve the reliability of resource selection.

In some embodiments, for one period of which a candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold and an interval between a last slot in the monitoring slot set and a reference time to be minimal and the interval to be greater than or equal to a first threshold.

For another example, assuming that the second threshold is 2, the slot set illustrated in 11011 is partially overlapped with the active time of the SL DRX (e.g., one slot is overlapped), and the slot set illustrated in 11012 is partially overlapped with the active time of the SL DRX (e.g., three slots are overlapped), the slot set illustrated in 11013 is partially overlapped with the active time of the SL DRX (e.g., four slots are overlapped), the slot set illustrated in 11012 and the slot set illustrated in 11013 meet a condition of overlapped slots (greater than the second threshold). Then, the slot set illustrated in 11012 and the slot set illustrated in 11013 are selected, and the slot set closest to n or y0 is selected, that is, the k value is determined to be 2.

In some embodiments, for one period of which the candidate slot set is determined that a corresponding slot needs to be monitored, in a case where none of the corresponding coefficient candidate values is unable to make monitoring slot sets to which the candidate slot set corresponds and the active time of the sidelink discontinuous reception have at least one overlapped slot or the number of overlapped slots thereof to be greater than a second threshold, the corresponding coefficient is determined from multiple candidate values as the following value that: an interval between a last slot in the monitoring slot sets and a reference time to be minimal and the interval to be greater than or equal to a first threshold.

For example, the reference time is a triggering time of resource selection (e.g., n), or is one of one or more candidate slots (e.g., a first slot y0 in the Y slots), however, this disclosure is not limited thereto. The first threshold may be predefined, for example, may be a minimum processing time of the terminal equipment.

Figure 12:
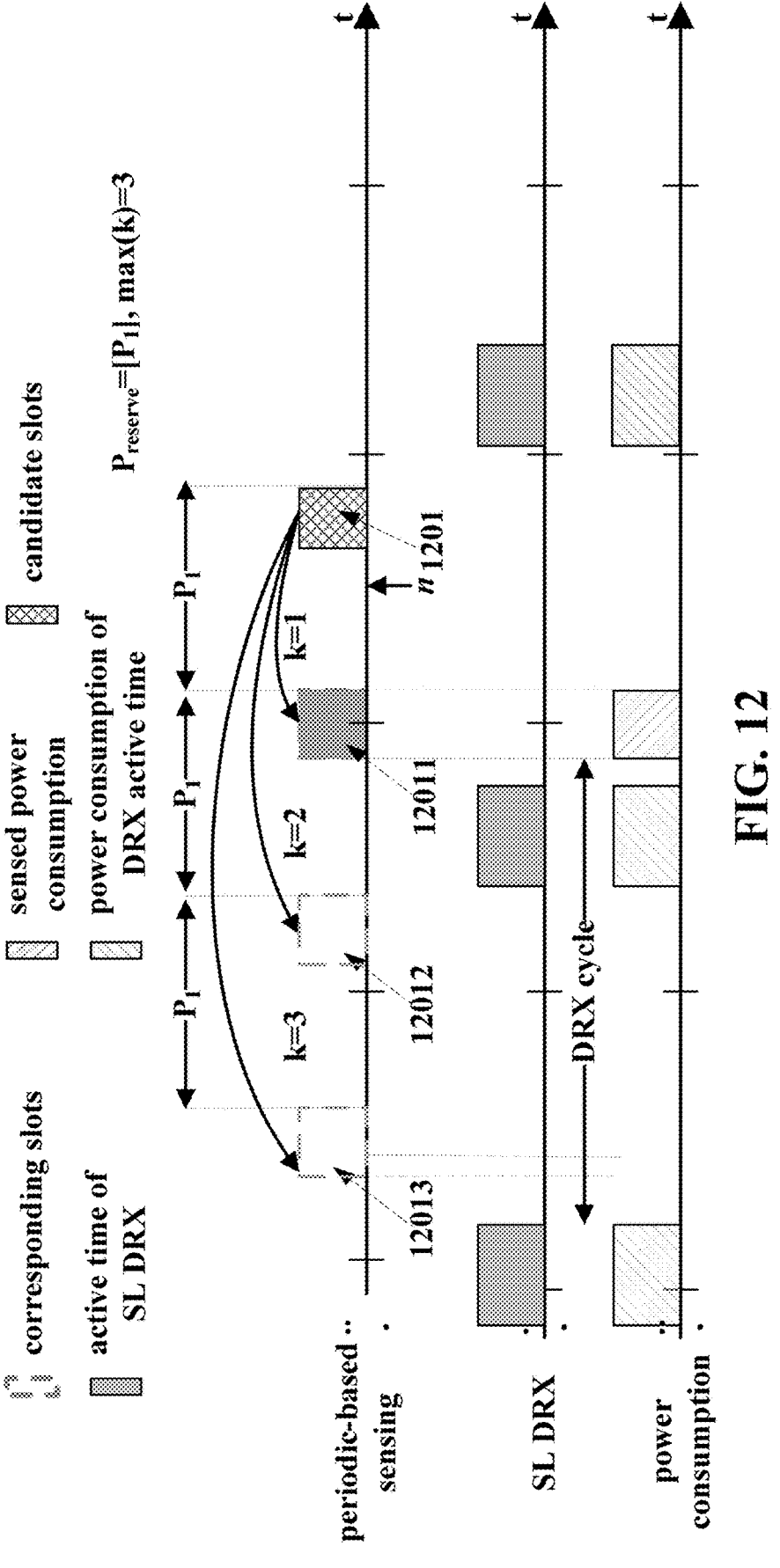
FIG. 12 is another example diagram illustrating a determination coefficient according to an embodiment of this disclosure.

FIG. 12 is another example diagram illustrating a determination coefficient according to an embodiment of this disclosure, which is illustrated by taking one period $P_1$ included in a $P_{reserve}$ set as an example, in which no second threshold is set. For example, as illustrated in FIG. 12, for a determined candidate slot set 1201 (Y candidate slots), when k=1, a corresponding slot set (as illustrated in 12011) is not overlapped with the active time of the SL DRX; when k=2, a corresponding slot set (as illustrated in 12012) is not overlapped with the active time of the SL DRX; when k=3, a corresponding slot set (as illustrated in 12013) is not overlapped with the active time of the SL DRX. Therefore, for the slot set of the candidate slot $$t_y^{SL}$$

(as illustrated in 1201), the k value is determined to be 1 (an interval between a monitoring slot $$t_{y-P1}^{SL}$$

and a reference time n or y0 is minimal and the interval is greater than or equal to a first threshold), a corresponding slot set that needs to be monitored is illustrated as 12011.

In this example, assuming that monitoring may be performed during non-active-time, and monitoring may be performed in the slot closest to the reference time, and may improve the accuracy of monitoring, and thus may select transmission resources with less interference and improve the reliability of sidelink transmission.

In some embodiments, a second threshold may also be set, which is still illustrated by taking FIG. 11 as an example. For example, assuming that the second threshold is 3, the slot set illustrated in 11011 is partially overlapped with the active time of the SL DRX (e.g., two slots are overlapped), and the slot set illustrated in 11013 is partially overlapped with the active time of the SL DRX (e.g., two slots are overlapped), there is no slot set with the number of overlapped slots greater than 3, so the k value is determined to be 1.

In some embodiments, a plurality of candidate values of the coefficient is/are configured or preconfigured, or a maximum value of the plurality of candidate values of the coefficient is configured or preconfigured.

For example, a candidate value of k may be configured or pre-configured in a resource pool, or a maximum value of k may be configured or pre-configured in the resource pool, then k may only be taken within a range of candidate values, or taken within a range of candidate values less than or equal to the maximum value. In the examples illustrated in FIGS. 9 to 12, the maximum value of k is 3, and the candidate values are {1, 2, 3}.

The description is given above by taking a single value of k as an example; however, this disclosure is not limited thereto. A plurality of values may also be taken for k, that is, for one candidate slot and one period in a corresponding $P_{reserve}$ candidate set, the specific number of times that needs to be monitored before the resource selection trigger is greater than 1, and the number of times may be predefined or configured or preconfigured in the resource pool. For example, for one period included in the $P_{reserve}$ set, when two values are taken for k, one k value is first determined according to the embodiment, and then the above steps are repeated to determine a different k value.

For example, in FIG. 10, for one period $P_1$ included in the $P_{reserve}$ set, the corresponding monitoring slot set is first determined, as illustrated in 10013, and at this time, k=3, the above steps may be performed again. Since the slot set (as illustrated in 10011) is partially overlapped with the DRX active time of the SL, the corresponding monitoring slot set may be determined, as illustrated in 10011, where k=1. In this case, k=[1, 3].

For another example, in FIG. 9, for one period P$_1$ included in the P$_{reserve}$ set, the corresponding monitoring slot set is first determined, as illustrated in 9011, and at this time k=1, the above steps may be performed again. Since the slot set (as illustrated in 9012) and the slot set (as illustrated in 9013) are not overlapped with the active time of the SL DRX, the corresponding monitoring slot may be determined to be a slot set which is closer to the reference time (as illustrated in 9012, then k=2). In this case, k=[1, 2].

In an embodiment of this disclosure, after the corresponding k value is determined for each period included in the P$_{reserve}$, respectively, a corresponding slot $$t^{SL}_{y-k \times Preserve}$$

in the sensing window before k P$_{reserve}$ periods for the candidate slot $$t^{SL}_{y-k \times Preserve}$$

needs to be monitored. For the periodic reserved SCI monitored in the slot $$t^{SL}_{y}$$

(the indicated reservation period is P$_{reserve}$), if the corresponding RSRP is greater than the threshold and frequency domain resources indicated by the SCI correspond to resources R in a slot after k P$_{reserve}$ periods, candidate resources that are overlapped with the resources R in a current transmission period or a subsequent transmission period need to be excluded in the corresponding slot $$t^{SL}_{y}.$$

In the above example, the terminal equipment may perform monitoring at non-active-time of the SL DRX, thereby obtaining a sensing result, and the terminal equipment may ensure that the slots that need to be monitored corresponding to the candidate slots may be monitored; however, this disclosure is not limited thereto.

In some embodiments, if for one period value P$_m$ that needs to be monitored corresponding to a candidate slot (a whole set is P$_{reserve}$), none of the alternative k values enables the candidate slot to be overlapped with the DRX active time of the configured SL, there is no need to monitor the candidate slot before this period.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It may be known from the embodiments that for the terminal equipment supporting the sidelink DRX and the sidelink partial sensing, one or more monitoring slots for performing the partial sensing of the sidelink is/are determined for a plurality of candidate slots according to the configuration information of the sidelink DRX; therefore, considering a situation in which the terminal equipment acts as both a transmitting device and a receiving device, power may be further saved, and the power-saving effect of the terminal equipment may be improved.

Embodiments of a Third Aspect

The embodiments of this disclosure provide an apparatus for selecting a sidelink resource. The apparatus may be, for example, a terminal equipment supporting sidelink discontinuous reception and sidelink partial sensing, or may be a or some components or assembles configured in the terminal equipment, with contents identical to those in the embodiments of the first and second aspects being not going to be described herein any further.

Figure 13:
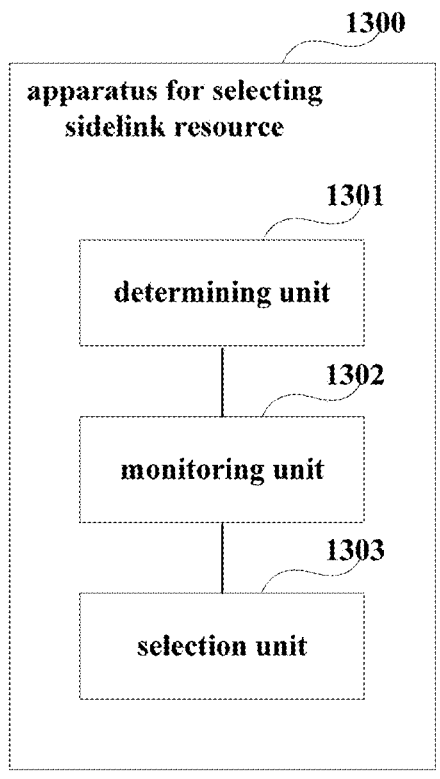
FIG. 13 is a schematic diagram illustrating an apparatus for selecting a sidelink resource according to an embodiment of this disclosure.

FIG. 13 is a schematic diagram illustrating an apparatus for selecting a sidelink resource according to an embodiment of this disclosure. As illustrated in FIG. 13, an apparatus for selecting a sidelink resource 1300 includes: a determining unit 1301, a monitoring unit 1302 and a selecting unit 1303.

In some embodiments, the determining unit 1301 determines one or more monitoring slots for performing sidelink partial sensing for a candidate slot according to configuration information of sidelink discontinuous reception; the monitoring unit 1302 performs monitoring on sidelink control information at the monitoring slots; and the selection unit 1303 performs resource selection according to a monitoring result.

In some embodiments, the configuration information of the sidelink discontinuous reception is at least used to determine the active time of the sidelink discontinuous reception, the active time of the sidelink discontinuous reception includes at least one of: a running time of a sidelink OnDuration timer, a running time of an inactive timer or a running time of a retransmission timer.

In some embodiments, the determining unit 1301 is configured to: determine one or more periods and corresponding coefficients; and for one period, take the candidate slot as a monitoring slot to which the one period corresponds after translating the candidate slot forward by P*k slots in a time domain, where P is the number of slots after the period is converted into a logical slot, and k is a coefficient corresponding to the period.

In some embodiments, the one or more periods are all or part of sidelink reservation period candidate values configured in a resource pool.

In some embodiments, for one period of which the candidate slot is determined that a corresponding slot needs to be monitored, the corresponding coefficients are determined from a plurality of candidate values as the following value that: a monitoring slot to which the candidate slot corresponds is the active time of the discontinuous reception of the sidelink.

In some embodiments, for one period of which the candidate slot is determined that a corresponding slot needs to be monitored, the corresponding coefficients are determined from a plurality of candidate values as the following value that: the monitoring slot to which the candidate slot corresponds is made to be the active time of the sidelink discontinuous reception, and an interval between the monitoring slot and a reference time is minimal and the interval is greater than or equal to a first threshold.

In some embodiments, for one period of which the candidate slot is determined that a corresponding slot needs to be monitored, in a case where none of corresponding coefficient candidate values enables the monitoring slot to which the candidate slot corresponds to be the active time of the discontinuous reception of the sidelink, the corresponding coefficients are determined as the following value that: an interval between the monitoring slot and a reference time is minimal and the interval is greater than or equal to a first threshold.

In some embodiments, a plurality of candidate values of the coefficient is/are configured or preconfigured, or a maximum value of the plurality of candidate values of the coefficient is configured or preconfigured.

In some embodiments, the reference time is a triggering time of resource selection, or is one of one or more candidate slots.

In some embodiments, the determining unit 1301 determines one or more monitoring slot for performing the sidelink partial sensing for each of a plurality of candidate slots, according to configuration information of the sidelink discontinuous reception; the monitoring unit 1302 performs monitoring on sidelink control information at the monitoring slots; and the selection unit 1303 performs resource selection according to a monitoring result.

In some embodiments, the configuration information of the sidelink discontinuous reception is at least used to determine an active time of the sidelink discontinuous reception, the active time of the sidelink discontinuous reception includes at least one of: a running time of a sidelink OnDuration timer, a running time of an inactive timer or a running time of a retransmission timer.

In some embodiments, the determining unit 1301 is configured to: determine one or more periods of a candidate slot set formed of the plurality of candidate slots and corresponding coefficients, where coefficients of the plurality of candidate slots for one period are identical; and for one period, take the candidate slot as a monitoring slot to which the one period corresponds after translating the candidate slot set forward by P*k slots in a time domain, where P is the number of slots after the period is converted to a logic slot, and k is a coefficient corresponding to the period.

In some embodiments, the one or more periods are all or part of sidelink reservation period candidate values configured in a resource pool.

In some embodiments, for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold.

In some embodiments, for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold and the number of overlapped slots is maximal.

In some embodiments, for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold and an interval between a last slot in the monitoring slot set and a reference time to be minimal and the interval to be greater than or equal to a first threshold.

In some embodiments, for one period of which the candidate slot set is determined that a corresponding slot needs to be monitored, in a case where none of corresponding coefficient candidate values enables make monitoring slot sets to which the candidate slot set corresponds and the active time of the sidelink discontinuous reception to have at least one overlapped slot or the number of overlapped slots thereof to be greater than a second threshold, the corresponding coefficients are determined as the following value that: an interval between a last slot in the monitoring slot set and a reference time is minimal and the interval is greater than or equal to a first threshold.

In some embodiments, a plurality of candidate values of the coefficient is/are configured or preconfigured, or a maximum value of the plurality of candidate values of the coefficient is configured or preconfigured.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above, however, this disclosure is not limited thereto. The apparatus for selecting a sidelink resource 1300 may further include other components or modules, and reference may be made to the related techniques for particulars of these components or modules.

In addition, for the sake of simplicity, connection relationships between the components or modules or signal profiles thereof are only exemplarily illustrated in FIG. 13. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It may be known from the embodiments that for the terminal equipment supporting the sidelink DRX and the sidelink partial sensing, one or more monitoring slots for performing the sidelink partial sensing is/are determined for a plurality of candidate slots according to the configuration information of the sidelink DRX; therefore, considering a situation in which the terminal equipment acts as both a transmitting device and a receiving device, power may be further saved, and the power-saving effect of the terminal equipment may be improved.

Embodiments of a Fourth Aspect

The embodiments of this disclosure further provide a communication system. Reference may be made to FIG. 1, with contents identical to those in the embodiments of the first to the third aspects being not going to be described herein any further.

In some embodiments, the communication system 100 may comprise at least:

a terminal equipment supporting sidelink discontinuous reception and sidelink partial sensing; the terminal equipment being configured to determine one or more monitoring slots for performing the sidelink partial sensing for one or more candidate slots according to configuration information of the sidelink discontinuous reception; perform monitoring on sidelink control information at the monitoring slots; and perform resource selection according to a monitoring result.

An embodiment of this disclosure further provides a network device, which may be, for example, a base station, however, this disclosure is not limited thereto, and the network device may also be other network devices.

Figure 14:
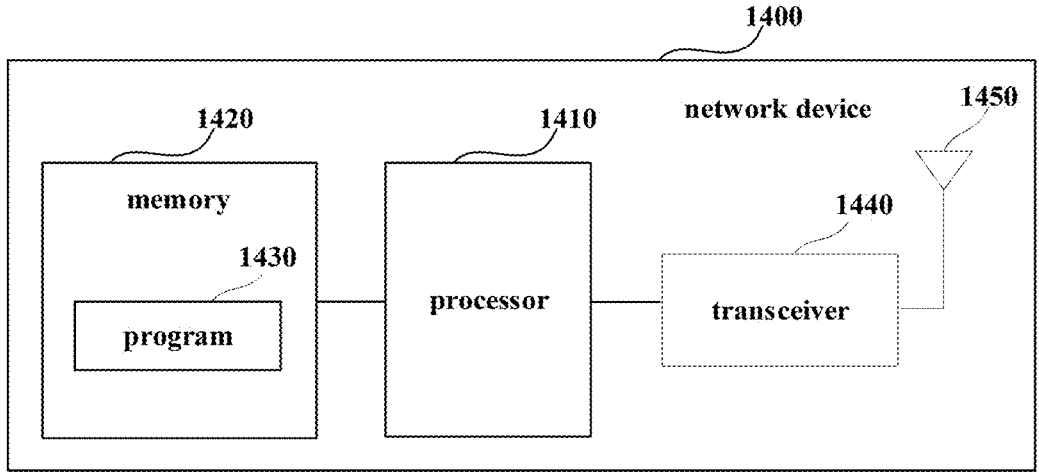
FIG. 14 is a schematic diagram illustrating a network device according to an embodiment of this disclosure.

FIG. 14 is a schematic diagram illustrating a network device according to an embodiment of this disclosure. As illustrated in FIG. 14, a network device 1400 may comprise: a processor 1410 (e.g., a central processing unit (CPU)) and a memory 1420. A memory 1120 is coupled to the processor 1410. The memory 1420 may store various data and may also store a program 1430 for information processing, and the program 1430 is executed under the control of the processor 1410.

In addition, as illustrated in FIG. 14, the network device 1400 may further include: a transceiver 1440, an antenna 1450; wherein functions of the above components are similar to those in the related art, which shall not be described herein any further. It should be noted that the network device 1400 does not necessarily include all the components illustrated in FIG. 14. Furthermore, the network device 1400 may also include components not illustrated in FIG. 14, and the relevant art may be referred to.

An embodiment of this disclosure further provides a terminal equipment, however, this disclosure is not limited thereto, and other devices may also be provided.

Figure 15:
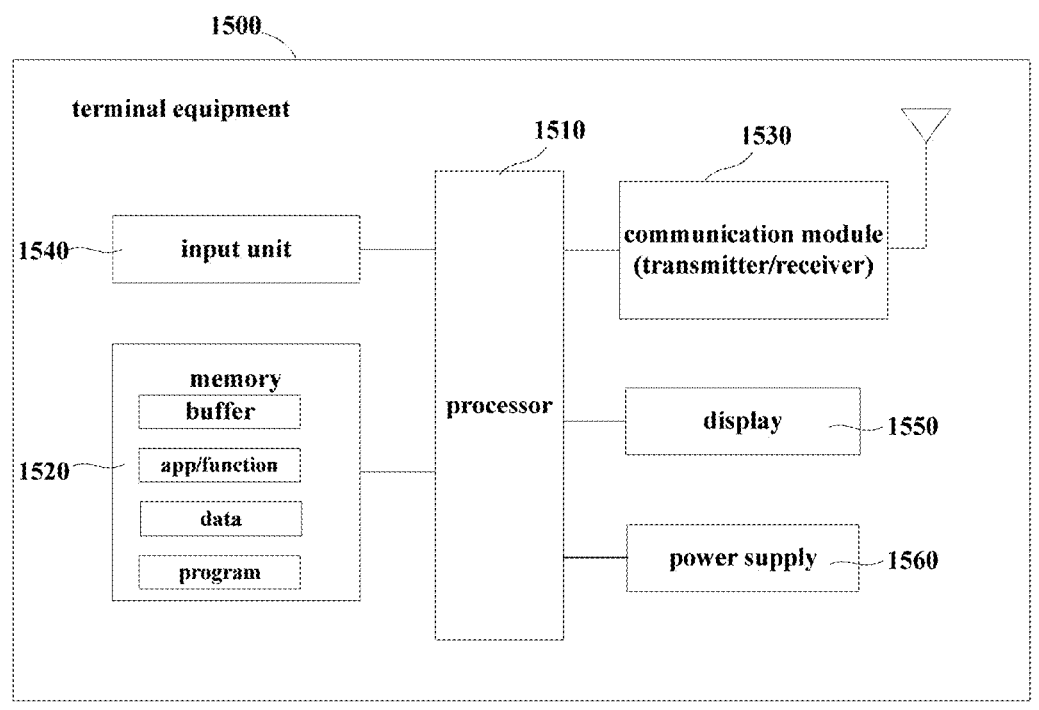
FIG. 15 is a schematic diagram illustrating a terminal equipment according to an embodiment of this disclosure.

FIG. 15 is a schematic diagram illustrating a terminal equipment according to an embodiment of this disclosure. As illustrated in FIG. 15, a terminal equipment 1500 may include a processor 1510 and a memory 1520. The memory 1520 stores data and programs, and is coupled to the processor 1510. It should be noted that this figure is illustrative, and other types of structures may be used, so as to supplement or replace this structure and achieve telecommunication functions or other functions.

For example, the processor 1510 may be configured to execute a program in order to implement the method for selecting a sidelink resource in the embodiments of the first aspect. For example, the processor 1510 may be configured to: determine one or more monitoring slots for performing sidelink partial sensing for a candidate slot according to configuration information of sidelink discontinuous reception; perform monitoring on sidelink control information at the monitoring slots; and perform resource selection according to a monitoring result.

For another example, the processor 1510 may be configured to execute a program to implement the method for selecting a sidelink resource according to the embodiments of the second aspect. For example, the processor 1510 may be configured to: determine one or more monitoring slots for performing sidelink partial sensing for each of a plurality of candidate slots according to configuration information of sidelink discontinuous reception; perform monitoring on sidelink control information at the monitoring slots; and perform resource selection according to a monitoring result.

As illustrated in FIG. 15, the terminal equipment 1500 may further include: a communication module 1530, an input unit 1540, a display 1550, and a power supply 1560; wherein functions of the above components are similar to those in the relevant art, which shall not be described herein any further. It should be noted that the terminal equipment 1500 does not necessarily include all the components illustrated in FIG. 15, and the above components are not required. Furthermore, the terminal equipment 1500 may also include components not illustrated in FIG. 15, and the relevant art may be referred to.

An embodiment of this disclosure further provides a computer program, which, when is executed in a terminal equipment, causes the terminal equipment to implement the method for selecting sidelink resources according to the embodiments of the first and second aspects.

An embodiment of this disclosure further provides a storage medium storing a computer program, wherein the computer program enables a terminal equipment to implement the method for selecting sidelink resources in the embodiments of the first and second aspects.

The above devices and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/devices described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FP GA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

1. A method for selecting a sidelink resource, applied to a terminal equipment supporting sidelink discontinuous reception (DRX) and sidelink partial sensing, including:

determining, by the terminal equipment, one or more monitoring slots for performing the sidelink partial sensing for a candidate slot according to configuration information of the sidelink discontinuous reception (DRX);

performing monitoring on sidelink control information at the monitoring slots; and performing resource selection according to a monitoring result.

2. The method according to supplement 1, wherein the configuration information of the sidelink discontinuous reception is at least used to determine an active time of the sidelink discontinuous reception;

the active time of the sidelink discontinuous reception includes at least one of: a running time of a sidelink OnDuration timer, a running time of an inactive timer or a running time of a retransmission timer.

3. The method according to supplement 1 or 2, wherein determining one or more monitoring slots corresponding to one candidate slot at least includes:

determining one or more periods and corresponding coefficients; and for one period, taking the candidate slot as a monitoring slot to which the one period corresponds after translating the candidate slot forward by P*k slots in a time domain, where P is the number of slots after the period is converted into a logical slot, and k is a coefficient corresponding to the period.

4. The method according to supplement 3, wherein the one or more periods are all or part of sidelink reservation period candidate values configured in a resource pool.

5. The method according to supplement 3, wherein for one period of which the candidate slot is determined that a corresponding slot needs to be monitored, the corresponding coefficients are determined from a plurality of candidate values as the following value that the monitoring slot to which the candidate slot corresponds is the active time of the sidelink discontinuous reception.

6. The method according to supplement 3, wherein for one period of which the candidate slot is determined that a corresponding slot needs to be monitored, the corresponding coefficients are determined from a plurality of candidate values as the following value that: the monitoring slot to which the candidate slot corresponds is the active time of the sidelink discontinuous reception, and an interval between the monitoring slot and a reference time is minimal and the interval is greater than or equal to a first threshold.

7. The method according to supplement 3, wherein for one period of which the candidate slot is determined that a corresponding slot needs to be monitored, in a case where none of corresponding coefficient candidate values enables the monitoring slot to which the candidate slot corresponds to be the active time of the discontinuous reception of the sidelink, the corresponding coefficients are determined as the following value that an interval between the monitoring slot and a reference time is minimal and the interval is greater than or equal to a first threshold.

8. The method according to any one of supplements 3 to 7, wherein a plurality of candidate values of the coefficient is/are configured or pre-configured, or a maximum value of the plurality of candidate values of the coefficient is configured or preconfigured.

9. The method according to supplement 6 or 7, wherein the reference time is a triggering time of resource selection, or is one of one or more candidate slots.

10. A method for selecting a sidelink resource, applied to a terminal equipment supporting sidelink discontinuous reception (DRX) and sidelink partial sensing, including:

determining, by the terminal equipment, one or more monitoring slots for performing the sidelink partial sensing for each of a plurality of candidate slots according to configuration information of sidelink discontinuous reception (DRX);

performing monitoring on sidelink control information at the monitoring slots; and performing resource selection according to a monitoring result.

11. The method according to supplement 10, wherein the configuration information of the sidelink discontinuous reception is at least used to determine an active time of the sidelink discontinuous reception;

the active time of the sidelink discontinuous reception includes at least one of: a running time of a sidelink OnDuration timer, a running time of an inactive timer or a running time of a retransmission timer.

12. The method according to supplement 10 or 11, wherein determining one or more monitoring slot corresponding to each of a plurality of candidate slots at least includes:

determining one or more periods of a candidate slot set formed of the plurality of candidate slots and corresponding coefficients, where the coefficients of the plurality of candidate slots for one period are identical; and for one period, taking the candidate slot as a monitoring slot to which the one period corresponds after translating the candidate slot set forward by P*k slots in a time domain, where P is the number of slots after the period is converted into a logical slot, and k is a coefficient corresponding to the period.

13. The method according to supplement 12, wherein the one or more periods are all or part of sidelink reservation period candidate values configured in a resource pool.

14. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold and the number of overlapped slots is maximal.

15. The method according to supplement 12, wherein for one period of which the candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold.

16. The method according to supplement 12, wherein for one period of which the candidate slot set is determined that a corresponding slot needs to be monitored, the corresponding coefficients are determined from a plurality of candidate values as the value that: a monitoring slot set to which the candidate slot set corresponds and the active time of the sidelink discontinuous reception are made to at least partially overlap with each other and the number of overlapped slots thereof to be greater than a second threshold.

17. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and the number of overlapped slots is maximal.

18. The method according to supplement 12, wherein for one period of which the candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold and the number of overlapped slots is maximal.

19. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and the number of overlapped slots thereof to be greater than a second threshold and the number of overlapped slots is maximal.

20. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold and an interval between a last slot in the monitoring slot set and a reference time to be minimal and the interval to be greater than or equal to a first threshold.

21. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds is at least partially overlapped with the active time of the sidelink discontinuous reception, and an interval between a last slot in the monitoring slot set and a reference time is minimal and the interval is greater than or equal to a first threshold.

22. The method according to supplement 12, wherein for one period of which the candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold, and an interval between a last slot in the monitoring slot set and a reference time is minimal and the interval is greater than or equal to a first threshold.

23. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and the number of overlapped slots thereof to be greater than a second threshold, and an interval between a last slot in the monitoring slot set and a reference time is minimal and the interval is greater than or equal to a first threshold.

24. The method according to supplement 12, wherein for one period of which the candidate slot set is determined that a corresponding slot needs to be monitored, the corresponding coefficients are determined from a plurality of candidate values as the following value that: a monitoring slot set to which the candidate slot set corresponds and the active time of the sidelink discontinuous reception are made to at least partially overlap with each other and the number of overlapped slots is maximal, and an interval between a last slot in the monitoring slot set and a reference time is minimal and the interval is greater than or equal to a first threshold.

25. The method according to supplement 12, wherein for one period of which the candidate slot set is determined that a corresponding slot needs to be monitored, the corresponding coefficients are determined from a plurality of candidate values as the following value that: the number of overlapped slots of a monitoring slot set to which the candidate slot set corresponds and the active time of the sidelink discontinuous reception is made to be greater than a second threshold and the number of overlapped slots is maximal, and an interval between a last slot in the monitoring slot set and a reference time is minimal and the interval is greater than or equal to a first threshold.

26. The method according to supplement 12, wherein for one period of which the candidate slot set is determined that a corresponding slot needs to be monitored, in a case where none of corresponding coefficient candidate values enables monitoring slot sets to which the candidate slot set corresponds and the active time of the sidelink discontinuous reception to have at least one overlapped slot or the number of overlapped slots thereof to be greater than a second threshold, the corresponding coefficient is determined from multiple candidate values as the following value that: an interval between a last slot in the monitoring slot set and a reference time is minimal and the interval is greater than or equal to a first threshold.

27. The method according to any one of supplements 12 to 26, wherein a plurality of candidate values of the coefficient is/are configured or pre-configured, or a maximum value of the plurality of candidate values of the coefficient is configured or preconfigured.

28. The method according to any one of supplements 20 to 27, wherein the reference time is a triggering time of resource selection, or is one of one or more candidate slots.

29. A terminal equipment, including a memory and a processor, wherein the memory stores a computer program, and the processor is configured to execute the computer program to implement the method for selecting sidelink resources according to any one of supplements 1 to 28.

30. A communication system, including:

a terminal equipment, which supports sidelink discontinuous reception (DRX) and sidelink partial sensing, configured to determine one or more monitoring slot for performing the sidelink partial sensing for a candidate slot according to configuration information of sidelink discontinuous reception (DRX); perform monitoring on sidelink control information at the monitoring slots; and perform resource selection according to a monitoring result.

31. A communication system, including:

a terminal equipment, which supports sidelink discontinuous reception (DRX) and sidelink partial sensing, configured to determine one or more monitoring slot for performing the sidelink partial sensing for each of a plurality of candidate slots according to configuration information of sidelink discontinuous reception; perform monitoring on sidelink control information at the monitoring slots; and perform resource selection according to a monitoring result.

What is claimed is:

1. An apparatus for selecting a sidelink resource, configured in a terminal equipment supporting sidelink discontinuous reception and sidelink partial sensing, the apparatus comprising:

a memory; and processor circuitry coupled to the memory and configured to:

determine one or more monitoring slots for performing the sidelink partial sensing for a candidate slot according to configuration information of sidelink discontinuous reception, wherein one or more periods and corresponding coefficients are determined, and for one period, the candidate slot is taken as a monitoring slot to which the one period corresponds after translating the candidate slot forward by P*k slots in a time domain, where P is the number of slots after the period is converted into a logical slot, and k is a coefficient corresponding to the period, and wherein for the period, in a case where none of corresponding coefficient candidate values is able to make the monitoring slot to which the candidate slot corresponds be in an active time of the sidelink discontinuous reception, the corresponding coefficients are determined as the following value that: an interval between the monitoring slot and a reference time is made to be minimal and the interval is greater than or equal to a first threshold;

perform monitoring on sidelink control information at the one or more monitoring slots; and perform resource selection according to a monitoring result;

wherein in a case where the processor circuitry is configured to control to perform period-based partial sensing in an inactive time of the sidelink discontinuous reception for a given period, a most recent sensing occasion from slots in the inactive time is taken as a monitoring slot included in the one or more monitoring slots.

2. The apparatus according to claim 1, wherein the configuration information of the sidelink discontinuous reception is at least used to determine an active time of the sidelink discontinuous reception, the active time of the sidelink discontinuous reception comprises at least one of: a running time of a sidelink OnDuration timer, a running time of an inactive timer or a running time of a retransmission timer.

3. The apparatus according to claim 1, wherein the one or more periods are all or part of sidelink reservation period candidate values configured in a resource pool.

4. The apparatus according to claim 1, wherein for the period, the corresponding coefficients are determined from a plurality of candidate values as the following value that: the monitoring slot to which the candidate slot corresponds is made to be in an active time of the sidelink discontinuous reception.

5. The apparatus according to claim 1, wherein for the period, the corresponding coefficients are determined from a plurality of candidate values as the following value that: the monitoring slot to which the candidate slot corresponds is made to be in an active time of the sidelink discontinuous reception, and an interval between the monitoring slot and a reference time is made to be minimal and the interval is greater than or equal to a first threshold.

6. The apparatus according to claim 1, wherein a plurality of candidate values of the coefficients is/are configured or preconfigured, or a maximum value of the plurality of candidate values of the coefficients is configured or preconfigured.

7. The apparatus according to claim 1, wherein the most recent sensing occasion is an occasion before a reference time, the reference time being a triggering time of resource selection or being one of one or more candidate slots.

8. The apparatus according to claim 1, wherein in a case where the processor circuitry is configured to control to perform the period-based partial sensing in an inactive time of the sidelink discontinuous reception, the processor circuitry only performs the monitoring on the most recent sensing occasion.

9. An apparatus for selecting a sidelink resource, configured in a terminal equipment supporting sidelink discontinuous reception and sidelink partial sensing, the apparatus comprising:

a memory; and processor circuitry coupled to the memory and configured to:

determine a monitoring slot for performing the sidelink partial sensing for each of a plurality of candidate slots according to configuration information of the sidelink discontinuous reception, wherein one or more periods and corresponding coefficients of a candidate slot set formed by the plurality of candidate slots are determined, the coefficients of the plurality of candidate slots for one period being identical, and for one period, the candidate slot set is taken as a monitoring slot set to which the one period corresponds after translating the candidate slot set forward by P*k slots in a time domain, where P is the number of slots after the period is converted into a logical slot, and k is a coefficient corresponding to the period, and wherein for the period, in a case where none of corresponding coefficient candidate values is able to make monitoring slot sets to which the candidate slot set corresponds and the active time of the sidelink discontinuous reception have at least one overlapped slot or the number of overlapped slots thereof to be greater than a second threshold, the corresponding coefficient is determined from multiple candidate values as the following value that: an interval between a last slot in the monitoring slot sets and a reference time to be minimal and the interval to be greater than or equal to a first threshold;

perform monitoring on sidelink control information at one or more monitoring slots; and perform resource selection according to a monitoring result;

wherein in a case where the processor circuitry is configured to control to perform period-based partial sensing in an inactive time of the sidelink discontinuous reception for a given period, a most recent sensing occasion from slots in the inactive time is taken as a monitoring slot included in the one or more monitoring slots.

10. The apparatus according to claim 9, wherein the configuration information of the sidelink discontinuous reception is at least used to determine an active time of the sidelink discontinuous reception, the active time of the sidelink discontinuous reception comprises at least one of: a running time of a sidelink OnDuration timer, a running time of an inactive timer or a running time of a retransmission timer.

11. The apparatus according to claim 9, wherein the one or more periods are all or part of sidelink reservation period candidate values configured in a resource pool.

12. The apparatus according to claim 9, wherein for the period, the corresponding coefficients are determined from a plurality of candidate values as the following value that: a monitoring slot set to which the candidate slot set corresponds is made to at least partially overlap with the active time of the sidelink discontinuous reception.

13. The apparatus according to claim 9, wherein for the period, the corresponding coefficients are determined from a plurality of candidate values as the following value that: the number of overlapped slots of a monitoring slot set to which the candidate slot set corresponds and the active time of the sidelink discontinuous reception is made to be greater than a second threshold.

14. The apparatus according to claim 9, wherein for the period, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold and the number of overlapped slots is maximal.

15. The apparatus according to claim 9, wherein for the period, the corresponding coefficients are determined from a plurality of candidate values as the following value that: a monitoring slot set to which the candidate slot set corresponds and the active time of the sidelink discontinuous reception are made to at least partially overlap with each other and/or the number of overlapped slots thereof to be greater than a second threshold and an interval between a last slot in the monitoring slot set and a reference time to be minimal and the interval to be greater than or equal to a first threshold.

16. A communication system, comprising:

a terminal equipment supporting sidelink discontinuous reception and sidelink partial sensing, the terminal equipment being configured to determine one or more monitoring slots for performing the sidelink partial sensing for one or more candidate slots according to configuration information of the sidelink discontinuous reception; perform monitoring on sidelink control information at the one or more monitoring slots; and perform resource selection according to a monitoring result;

wherein one or more periods and corresponding coefficients are determined, and for one period, the candidate slot is taken as a monitoring slot to which the one period corresponds after translating the candidate slot forward by P*k slots in a time domain, where P is the number of slots after the period is converted into a logical slot, and k is a coefficient corresponding to the period, wherein for the period, in a case where none of corresponding coefficient candidate values is able to make the monitoring slot to which the candidate slot corresponds be in an active time of the sidelink discontinuous reception, the corresponding coefficients are determined as the following value that: an interval between the monitoring slot and a reference time is made to be minimal and the interval is greater than or equal to a first threshold, and wherein in a case where the terminal equipment is configured to control to perform period-based partial sensing in an inactive time of the sidelink discontinuous reception for a given period, a most recent sensing occasion from slots in the inactive time is taken as a monitoring slot included in the one or more monitoring slots.

\* \* \* \* \*